US 9,258,607 B2

(12) United States Patent
Chen

(10) Patent No.: US 9,258,607 B2
(45) Date of Patent: *Feb. 9, 2016

(54) METHODS AND APPARATUS TO DETERMINE LOCATIONS OF AUDIENCE MEMBERS

(71) Applicant: The Nielsen Company (US), LLC, Schaumburg, IL (US)

(72) Inventor: Jie Chen, Land O Lakes, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/500,443

(22) Filed: Sep. 29, 2014

(65) Prior Publication Data
US 2015/0052541 A1   Feb. 19, 2015

Related U.S. Application Data

(63) Continuation of application No. 12/967,415, filed on Dec. 14, 2010, now Pat. No. 8,885,842.

(51) Int. Cl.
*H04N 7/16* (2011.01)
*H04N 21/442* (2011.01)
(Continued)

(52) U.S. Cl.
CPC .......... *H04N 21/44218* (2013.01); *G01S 3/801* (2013.01); *H04R 3/005* (2013.01); *H04R 2430/21* (2013.01)

(58) Field of Classification Search
CPC .............................................. H04N 21/44222
USPC ................. 381/56, 58–59, 306; 725/9–10, 18
See application file for complete search history.

(56) References Cited

U.S. PATENT DOCUMENTS 3,056,135 A   9/1962   Currey et al.
4,107,734 A   8/1978   Percy et al.
(Continued)

FOREIGN PATENT DOCUMENTS

GB   2260246   7/1993
GB   2292506   2/1996
(Continued)

OTHER PUBLICATIONS

Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).

(Continued)

*Primary Examiner* — Disler Paul
(74) *Attorney, Agent, or Firm* — Hanley, Flight & Zimmerman, LLC

(57) ABSTRACT

A disclosed example method involves determining, using a neural network at a stationary unit, a first distance of a first portable audio detector from the stationary unit, the first portable audio detector associated with a first panelist, the stationary unit located in proximity to the media presentation device. The example method also involves determining, using the neural network, a second distance of a second portable audio detector from the stationary unit, the second portable audio detector associated with a second panelist. In response to the first distance being less than a threshold distance, the media is credited as exposed to the first panelist. In response to the second distance being more than the threshold distance, the media is not credited as exposed to the second panelist.

21 Claims, 18 Drawing Sheets

(51) Int. Cl.
*H04R 3/00* (2006.01)
*G01S 3/801* (2006.01)

(56) References Cited

U.S. PATENT DOCUMENTS

| | | |
|---|---|---|
| 4,382,291 A | 5/1983 | Nakauchi |
| 4,626,904 A | 12/1986 | Lurie |
| 4,644,509 A | 2/1987 | Kiewit et al. |
| 4,695,879 A | 9/1987 | Weinblatt |
| 4,718,106 A * | 1/1988 | Weinblatt ............... H04H 20/31 379/92.04 |
| 4,769,697 A | 9/1988 | Gilley et al. |
| 4,779,198 A | 10/1988 | Lurie |
| 4,930,011 A | 5/1990 | Kiewit |
| 4,955,000 A | 9/1990 | Nastrom |
| 4,972,471 A | 11/1990 | Gross et al. |
| 4,972,503 A | 11/1990 | Zurlinden |
| 4,990,892 A | 2/1991 | Guest et al. |
| 5,119,104 A | 6/1992 | Heller |
| 5,146,231 A | 9/1992 | Ghaem et al. |
| 5,226,090 A | 7/1993 | Kimura |
| 5,226,177 A | 7/1993 | Nickerson |
| 5,285,498 A | 2/1994 | Johnston |
| 5,382,970 A | 1/1995 | Kiefl |
| 5,387,993 A | 2/1995 | Heller et al. |
| 5,404,377 A | 4/1995 | Moses |
| 5,442,343 A | 8/1995 | Cato et al. |
| 5,457,807 A | 10/1995 | Weinblatt |
| 5,473,631 A | 12/1995 | Moses |
| 5,481,294 A | 1/1996 | Thomas et al. |
| 5,483,276 A | 1/1996 | Brooks et al. |
| 5,550,928 A | 8/1996 | Lu et al. |
| 5,574,962 A | 11/1996 | Fardeau et al. |
| 5,579,124 A | 11/1996 | Aijala et al. |
| 5,581,800 A | 12/1996 | Fardeau et al. |
| 5,583,776 A | 12/1996 | Levi et al. |
| 5,629,739 A | 5/1997 | Dougherty |
| 5,630,203 A | 5/1997 | Weinblatt |
| 5,640,144 A | 6/1997 | Russo et al. |
| 5,646,675 A | 7/1997 | Copriviza et al. |
| 5,692,215 A | 11/1997 | Kutzik et al. |
| 5,774,876 A | 6/1998 | Woolley et al. |
| 5,787,334 A | 7/1998 | Fardeau et al. |
| 5,793,409 A | 8/1998 | Tetsumura |
| 5,812,930 A | 9/1998 | Zavrel |
| 5,815,114 A | 9/1998 | Speasl et al. |
| 5,872,588 A | 2/1999 | Aras et al. |
| 5,884,278 A | 3/1999 | Powell |
| 5,893,093 A | 4/1999 | Wills |
| 5,980,246 A | 11/1999 | Ramsay et al. |
| 5,982,808 A | 11/1999 | Otto |
| 6,002,918 A | 12/1999 | Heiman et al. |
| 6,035,177 A | 3/2000 | Moses et al. |
| 6,054,950 A | 4/2000 | Fontana |
| 6,091,956 A | 7/2000 | Hollenberg |
| 6,098,048 A | 8/2000 | Dashefsky et al. |
| 6,243,739 B1 | 6/2001 | Schwartz et al. |
| 6,252,522 B1 | 6/2001 | Hampton et al. |
| 6,359,557 B2 | 3/2002 | Bilder |
| 6,396,413 B2 | 5/2002 | Hines et al. |
| 6,424,264 B1 | 7/2002 | Giraldin et al. |
| 6,430,498 B1 | 8/2002 | Maruyama et al. |
| 6,433,689 B1 | 8/2002 | Hovind et al. |
| 6,446,261 B1 | 9/2002 | Rosser |
| 6,467,089 B1 | 10/2002 | Aust et al. |
| 6,470,264 B2 | 10/2002 | Bide |
| 6,493,649 B1 | 12/2002 | Jones et al. |
| 6,497,658 B2 | 12/2002 | Roizen et al. |
| 6,563,423 B2 | 5/2003 | Smith |
| 6,577,238 B1 | 6/2003 | Whitesmith et al. |
| 6,647,548 B1 | 11/2003 | Lu et al. |
| 6,654,800 B1 | 11/2003 | Rieger, III |
| 6,697,628 B1 | 2/2004 | Green et al. |
| 6,703,918 B1 | 3/2004 | Kita |
| 6,731,942 B1 | 5/2004 | Nageli |
| 6,748,317 B2 | 6/2004 | Maruyama et al. |
| 6,766,524 B1 | 7/2004 | Matheny et al. |
| 6,842,877 B2 | 1/2005 | Robarts et al. |
| 6,882,837 B2 | 4/2005 | Fernandez et al. |
| 6,888,457 B2 | 5/2005 | Wilkinson et al. |
| 6,890,285 B2 | 5/2005 | Rahman et al. |
| 6,898,434 B2 | 5/2005 | Pradhan et al. |
| 6,919,803 B2 | 7/2005 | Breed |
| 6,928,280 B1 | 8/2005 | Xanthos et al. |
| 6,934,508 B2 | 8/2005 | Ceresoli et al. |
| 6,940,403 B2 | 9/2005 | Kail, IV |
| 6,958,710 B2 | 10/2005 | Zhang et al. |
| 6,967,674 B1 | 11/2005 | Lausch |
| 6,970,131 B2 | 11/2005 | Percy et al. |
| 7,038,619 B2 | 5/2006 | Percy et al. |
| 7,046,162 B2 | 5/2006 | Dunstan |
| 7,076,441 B2 | 7/2006 | Hind et al. |
| 7,080,061 B2 | 7/2006 | Kabala |
| 7,099,676 B2 | 8/2006 | Law et al. |
| 7,126,454 B2 | 10/2006 | Bulmer |
| 7,148,803 B2 | 12/2006 | Bandy et al. |
| 7,155,159 B1 | 12/2006 | Weinblatt et al. |
| 7,171,331 B2 | 1/2007 | Vock et al. |
| 7,222,071 B2 | 5/2007 | Neuhauser et al. |
| 7,295,108 B2 | 11/2007 | Corrado et al. |
| 7,373,820 B1 | 5/2008 | James |
| 7,460,827 B2 | 12/2008 | Schuster et al. |
| 7,463,143 B2 | 12/2008 | Forr et al. |
| 7,471,987 B2 | 12/2008 | Crystal et al. |
| 7,483,975 B2 | 1/2009 | Kolessar et al. |
| 7,739,705 B2 | 6/2010 | Lee et al. |
| 7,882,514 B2 | 2/2011 | Nielsen et al. |
| 8,526,626 B2 | 9/2013 | Nielsen et al. |
| 8,549,552 B2 * | 10/2013 | Ramaswamy ......... H04R 29/00 381/56 |
| 8,699,723 B2 * | 4/2014 | Fried ....................... H03G 3/32 381/104 |
| 8,738,763 B2 | 5/2014 | Crystal et al. |
| 2002/0068556 A1 | 6/2002 | Brown |
| 2002/0097885 A1 | 7/2002 | Birchfield et al. |
| 2002/0144259 A1 | 10/2002 | Gutta et al. |
| 2002/0150387 A1 | 10/2002 | Kunii et al. |
| 2002/0166119 A1 | 11/2002 | Cristofalo |
| 2002/0174425 A1 | 11/2002 | Markel et al. |
| 2002/0198762 A1 | 12/2002 | Donato |
| 2003/0033600 A1 | 2/2003 | Cliff et al. |
| 2003/0040272 A1 | 2/2003 | Lelievre et al. |
| 2003/0070182 A1 | 4/2003 | Pierre et al. |
| 2003/0093784 A1 | 5/2003 | Dimitrova et al. |
| 2003/0097302 A1 | 5/2003 | Overhultz et al. |
| 2003/0122708 A1 | 7/2003 | Percy et al. |
| 2003/0126593 A1 | 7/2003 | Mault |
| 2003/0136827 A1 | 7/2003 | Kaneko et al. |
| 2003/0146871 A1 | 8/2003 | Karr et al. |
| 2003/0171833 A1 | 9/2003 | Crystal et al. |
| 2003/0177488 A1 | 9/2003 | Smith et al. |
| 2003/0194004 A1 | 10/2003 | Srinivasan |
| 2003/0208754 A1 | 11/2003 | Sridhar et al. |
| 2003/0222819 A1 | 12/2003 | Karr et al. |
| 2003/0222820 A1 | 12/2003 | Karr et al. |
| 2004/0019675 A1 | 1/2004 | Hebeler, Jr. et al. |
| 2004/0025174 A1 | 2/2004 | Cerrato |
| 2004/0027271 A1 | 2/2004 | Schuster et al. |
| 2004/0039855 A1 | 2/2004 | Bohrer et al. |
| 2004/0072577 A1 | 4/2004 | Myllymaki et al. |
| 2004/0073615 A1 | 4/2004 | Darling |
| 2004/0073915 A1 | 4/2004 | Dureau |
| 2004/0122679 A1 | 6/2004 | Neuhauser et al. |
| 2004/0198386 A1 | 10/2004 | Dupray |
| 2004/0266457 A1 | 12/2004 | Dupray |
| 2005/0006466 A1 | 1/2005 | Overhultz et al. |
| 2005/0035857 A1 | 2/2005 | Zhang et al. |
| 2005/0141345 A1 | 6/2005 | Holm et al. |
| 2005/0144632 A1 | 6/2005 | Mears et al. |
| 2005/0172311 A1 | 8/2005 | Hjelt et al. |
| 2005/0200476 A1 | 9/2005 | Forr et al. |
| 2005/0201826 A1 | 9/2005 | Zhang et al. |
| 2005/0203798 A1 | 9/2005 | Jensen et al. |
| 2005/0204379 A1 | 9/2005 | Yamamori |

(56) References Cited

U.S. PATENT DOCUMENTS

| | | |
|---|---|---|
| 2005/0207592 A1 | 9/2005 | Sporer et al. |
| 2005/0216509 A1 | 9/2005 | Kolessar et al. |
| 2005/0234774 A1 | 10/2005 | Dupree |
| 2005/0243784 A1 | 11/2005 | Fitzgerald et al. |
| 2005/0244012 A1* | 11/2005 | Asada ............................ 381/56 |
| 2005/0264430 A1 | 12/2005 | Zhang et al. |
| 2006/0053110 A1 | 3/2006 | McDonald et al. |
| 2006/0075421 A1 | 4/2006 | Roberts et al. |
| 2006/0168613 A1 | 7/2006 | Wood et al. |
| 2007/0011040 A1 | 1/2007 | Wright et al. |
| 2007/0266395 A1 | 11/2007 | Lee et al. |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0091087 A1 | 4/2008 | Neuhauser et al. |
| 2008/0101454 A1 | 5/2008 | Luff et al. |
| 2008/0204273 A1 | 8/2008 | Crystal et al. |
| 2009/0037575 A1 | 2/2009 | Crystal et al. |
| 2010/0169908 A1* | 7/2010 | Nielsen ............ H04N 21/44222 725/14 |
| 2010/0199296 A1 | 8/2010 | Lee et al. |
| 2011/0091055 A1 | 4/2011 | LeBlanc |
| 2012/0020486 A1* | 1/2012 | Fried et al. ....................... 381/58 |
| 2012/0148067 A1 | 6/2012 | Petersen et al. |
| 2012/0169359 A1 | 7/2012 | Kim et al. |
| 2012/0219156 A1 | 8/2012 | Ramaswamy et al. |
| 2013/0034244 A1 | 2/2013 | Van Raalte et al. |
| 2013/0160042 A1 | 6/2013 | Stokes et al. |
| 2013/0166050 A1 | 6/2013 | Duwenhorst |
| 2013/0238276 A1 | 9/2013 | Vock et al. |
| 2014/0007153 A1 | 1/2014 | Nielsen et al. |
| 2014/0250448 A1 | 9/2014 | Nielsen |
| 2014/0282640 A1 | 9/2014 | Nielsen |
| 2014/0282663 A1 | 9/2014 | Lee |

FOREIGN PATENT DOCUMENTS

| | | |
|---|---|---|
| JP | 2000307530 | 11/2000 |
| KR | 1020120131826 | 12/2012 |
| WO | 9111062 | 7/1991 |
| WO | 9411989 | 5/1994 |
| WO | 9731440 | 8/1997 |
| WO | 9955057 | 10/1999 |
| WO | 0131816 | 5/2001 |
| WO | 03087871 | 10/2003 |
| WO | 2004051303 | 6/2004 |
| WO | 2004051304 | 6/2004 |
| WO | 2006037014 | 4/2006 |
| WO | 2006096177 | 9/2006 |
| WO | 2006121681 | 11/2006 |

OTHER PUBLICATIONS

Bernstein et al., "An Introduction to Map Matching for Personal Navigation Assistants," New Jersey TIDE Center, New Jersey Institute of Technology, Aug. 1996 (17 pages).
Kerschbaumer, Ken, "Who's Really Watching?" PricewaterhouseCoopers Global Entertainment and Medai Outlook 2004-2008, May 16, 2005 (4 pages).
McCarthy et al., "RF Free Ultrasonic Positioning," Department of Computer Science, University of Bristol, U.K., 2003 (7 pages).
McCarthy et al., "RF Free Ultrasonic Positioning (Presentation)," 7th International Symposiom on Wearable Computers, Oct. 2003 (12 pages).
Gentile et al., "Robust Location using System Dynamics and Motion Constraints," National Institute of Standards and Technology, Wireless Communication Technologies Group, Jun. 24, 2004 (5 pages).
Cricket Project, "Cricket v2 User Manual," MIT Computer Science and Artificial Intelligence Lab, Cambridge, U.S.A., Jan. 2005 (57 pages).
Holm, Sverre, "Technology Presentation," [online]. Sonitor Technologies, May 26, 2004 [retrieved on Oct. 13, 2004]. Retrieved from the Internet: <URL: www.sonitor.com/news/article.asp?id=62> (16 pages).
"The Nibble Location System," [online]. UCLA, May 21, 2001 [retrieved on Nov. 2, 2004]. Retrieved from the Internet: <URL: http://mmsl.cs.ucla.edu/nibble/>. (13 pages).
"New Sonitor Patent Combines Ultrasound and RFID," [online]. Sonitor Technologies, Feb. 17, 2005 [retrieved on Jun. 13, 2005]. Retrieved from the Internet: <URL: http://sonitor.com/news/article.asp?id=73>. (1 page).
"NIST Location System," [online]. Wireless Communication Technologies Group, National Institute of Standards and Technology, Mar. 12, 2004 [retrieved in Nov. 1, 2004]. Retrieved from the Internet: <URL: www.antd.nist.gov>. (2 pages).
Ferguson, Michael, "XTension Tech Notes," [online]. Sand Hill Engineering Inc., Dec. 10, 1998 [retrieved in Jan. 12, 2004]. Retrieved from the Internet: <URL: http://www.shed.com/articles/TN.proximity.html >. (9 pages).
"FM Wireless Microphone Module Kits," [online]. Horizon Industries, 2004 [retrieved on Sep. 30, 2004]. Retrieved from the Internet: <URL: www.horizonindustries.com/fm.htm>. (1 page).
"Arkon Sound Feeder II FM Transmitter," [online].Yahoo Shopping, 2002 [retrieved on Sep. 29, 2004]. Retrieved from the Internet: <URL: http://store.yahoo.com/semsons-inc/arsoundfeedii.html>. (2 pages).
"Dust Networks—SmartMesh," [online]. Dust Networks Inc., 2002 [retrieved on Sep. 29, 2004]. Retrieved from the Internet: <URL: www.dustnetworks.com>. (2 pages).
Kanellos, Michael, "Dust Makes Mesh of Wireless Sensors," [online]. CNET News.com, Sep. 20, 2004 [retrieved on Sep. 29, 2004]. Retrieved from the Internet: <URL: http://www.news.com/Dust-makes-mesh-of-wireless-sensors/2100-1008_3-5374971.html?tag=item>. (2 pages).
"UHF Radio Data Logging System—Genll Data Logger," [online]. Amplicon, 2004 [retrieved on Sep. 29, 2004]. Retrieved from the Internet: <URL: www.amplicon.co.uk/dr-prod3.cfm/subsecid/10037/secid/1/groupid/11809.htm>. (3 pages).
"Eltek Genll Radio Data Logging System," [online]. Eltek Ltd., 2004 [retrieved on Sep. 29, 2004]. Retrieved from the Internet: <URL: www.elteckdataloggers.co.uk>. (4 pages).
"World's Smallest Hands Free Radio," [online]. Yahoo Shopping, 2004 [retrieved on Sep. 29, 2004]. Retrieved from the Internet: <URL: http://store.yahoo.com/latesttrends/worsmalhanfr.html>. (1 page).
"American Technology Corporation—Retailer Ads—AM & FM Sounds," [online]. Woody Norris, May 4, 2004 [retrieved on Sep. 29, 2004]. Retrieved from the Internet: <URL: www.woodynorris.com>. (3 pages).
"X1 Button Radio—The World's Smallest Radio," [online]. Exxun, 2004 [retrieved on Sep. 29, 2004]. Retrieved from the Internet: <URL: www.exxun.com>. (2 pages).
"Discovery Spy Motion Tracking System," [online]. Discovery Communications Inc., 2004 [retrieved on Sep. 14, 2004]. Retrieved from the Internet: <URL: http://shopping.discovery.com/stores/servlet/ProductDisplay? catalogId=10000&storeId=10000&lanlan=-1&productId=53867&partnunnber=689638>. (3 pages).
Schuman, Evan. "Smarter Smart Cart?" [online]. Storefront Backtalk, Feb. 16, 2005 [retrieved on Nov. 20, 2006]. Retrieved from the Internet: <URL: www.storefrontbacktalk.com>. (5 pages).
"Arbitron & Scarborough Unveil New Mall Shopper Audience Measurement," [online]. Streamline Media Inc., Jun. 22, 2007 [retrieved in 2007]. Retrieved from the Internet: <URL: www.radioink.com>. (2 pages).
"University Library Navigation Enabled by Ekahau," [online]. Directions Magazine, Jun. 12, 2003 [Aug. 3, 2007]. Retrieved from the Internet: <URL: http://www/directionsmag.com/press.releases/index.php? duty=Show&id=7276&trv=1>. (3 pages).
Yeung, K.L., & Yum, T.-S.P. "A Comparative Study on Location Tracking Strategies in Cellular Mobile Radio Systems," Global Telecommunications Conference, 1995. Globecom '95, IEEE, Nov. 14-26, 1995 (pp. 22-28 vol. 1).

(56) References Cited

OTHER PUBLICATIONS

Handy et al., "Lessons Learned from Developing a Bluetooth Multiplayer-Game," 2nd International Conference on Pervasive Computing, Workshop on Gaming, [retrieved from Internet, http://www.ipsi.fraunhofer.de/ambiente/pervasivegaming/papers/Handy_Pervasive2004.pdf] (7 pages).

Battiti, Roberto, et al. "Location-Aware Computing: a Neutral Network Model for Determining Location in Wireless LANS" University of Trento: Department of Information and Communication Technology, Technical Report #DIT-02-0083, Feb. 2002 (pp. 1-16).

Azondekon et al., "Service Selection in Networks Based on Proximity Confirmation Using Infrared", http://www.scs.carleton.ca/~barbeau/Publications/2002/azondekon.pdf, International Conference on Telecommunications (ICT) Beijing, 2002 (5 Pages).

Bahl et al., "A Software System for Locating Mobile Users: Design, Evaluation, and Lessons," Technical Report MSR-TR-2000-12 Microsoft Research, [retrieved from internet, http://research.microsoft.com/~bahl/Papers/Pdf/radar.pdf] Feb. 2000 (13 pages).

Wagner, David P. Batelle. Report: Lexington Area Travel Data Collection Test; GPS for Personal Travel Surveys. Final Report for Office of Highway Information Management, Office of Technology Application and Federal Highway Administration, Sep. 1997 (92 pages).

Japan Patent Office, "Notice of Reasons for Rejection," issued in connection with Japanese Patent Application No. 2011-121053, mailed Feb. 14, 2013 (4 pages).

United States Patent and Trademark Office, "Non-Final Office Action," issued in connection with U.S. Appl. No. 14/313,414, mailed Mar. 13, 2015 (5 pages).

United States Patent and Trademark Office, "Notice of Allowance," issued in connection with U.S. Appl. No. 13/791,432, mailed Apr. 10, 2015 (9 pages).

United States Patent and Trademark Office, "Notice of Allowance," issued in connection with U.S. Appl. No. 14/313,414 mailed Jul. 17, 2015 (8 pages).

United States Patent and Trademark Office, "Notice of Allowance," issued in connection with U.S. Appl. No. 13/791,432, mailed Jul. 9, 2014 (8 pages).

United States Patent and Trademark Office, "Non-Final Office Action," issued in connection with U.S. No. 13/791,432 mailed Mar. 18, 2014 (7 pages).

International Searching Authority, "International Search Report," issued in connection with International Patent Application No. PCT/US2014/020337, Jun. 27, 2014 (4 pages).

* cited by examiner

METHODS AND APPARATUS TO DETERMINE LOCATIONS OF AUDIENCE MEMBERS

RELATED APPLICATION

This patent arises from a continuation of U.S. patent application Ser. No. 12/967,415, filed on Dec. 14, 2010, which is hereby incorporated by reference herein in its entirety.

FIELD OF THE DISCLOSURE

The present disclosure relates generally to monitoring media and, more particularly, to methods and apparatus to determine locations of audience members.

BACKGROUND

Consuming media presentations generally involves listening to audio information and/or viewing video information such as, for example, radio programs, music, television programs, movies, still images, etc. Media-centric companies such as, for example, advertising companies, broadcasting networks, etc. are often interested in the viewing and listening interests of their audience to better market their products. A technique often used to measure the number and/or demographics of audience members exposed to media involves awarding media exposure credit to a media presentation each time an audience member is exposed to (e.g., is in the vicinity of) the media presentation.

The media exposure activities of audience members may be monitored using personal portable metering devices (PPMs), which are also known as portable meters, portable metering devices, and/or portable personal meters. A PPM is an electronic device that is typically worn (e.g., clipped to a belt or other apparel) or carried by an audience member. Some PPMs are configured to monitor media exposure by detecting or collecting information (e.g., program or source identifier codes, signatures, etc.) from audio and/or video signals that are emitted or presented by media delivery devices (e.g., televisions, stereos, speakers, computers, etc.).

An audience member or monitored individual performs their usual daily routine while wearing a PPM. The monitored individual's daily routine may include listening to the radio and/or other sources of audio media and/or watching television programs and/or other sources of audio/visual media. As the audience member is exposed to (e.g., views, listens to, is in the vicinity of, etc.) media, a PPM associated with (e.g., assigned to and carried by) that audience member generates monitoring data.

Unfortunately, the typical household presents unique monitoring challenges to the PPM. For example, a typical household includes multiple media delivery devices, each configured to deliver media content to specific viewing and/or listening areas located within the home. A PPM, carried by a person who is located in one of the viewing and/or listening areas, is configured to detect any media content being delivered in the viewing and/or listening area and to credit the programming associated with the media content as having been delivered to the corresponding audience member. Thus, the PPM operates on the premise that any media content detected by the PPM is associated with programming to which the person carrying the PPM was exposed. However, in some cases, a PPM may detect media content that is emitted by a media delivery device that is not located within the viewing or listening proximity of the person carrying the PPM, thereby causing the detected programming to be improperly credited.

The ability of the PPM to detect audio/video content being delivered outside of the viewing and/or listening proximity of the person carrying the PPM is an effect referred to as "spillover" because the media content being delivered outside of the viewing and/or listening proximity of the person carrying the PPM is described as "spilling over" into the area occupied by the person carrying the PPM. Spillover may occur, for example, in a case where a monitored individual in a bedroom is reading a book, but their PPM detects audio/video content delivered by a television in an adjacent living room (i.e., outside of their viewing/listening proximity), thereby causing the person carrying the PPM to be improperly credited as a member of the audience for the audio/video content.

Another effect, referred to as "hijacking" occurs when a person's PPM detects audio/video content being emitted from multiple media delivery devices at the same time. For example, an adult watching a television news program in a household kitchen may be located near a household family room in which children are watching a television cartoon program on a different television. Yet, the cartoon programming delivered by the family room television may, in some cases, have signals that overpower or "hijack" the signals associated with the news programming being emitted by the kitchen television. As a result, information collected by the adult's PPM may lead to inaccurately crediting the cartoon program as having been viewed by the adult and failing to credit the news program with any viewing. Still further, other common difficulties such as varying volume levels, varying audio/video content type (e.g., sparse, medium, rich, etc.), varying household transmission characteristics due to open/closed doors, movement and/or placement of furniture, acoustic characteristics of room layouts, wall construction, floor coverings, ceiling heights, etc. may lead to inaccurate audio/video content exposure detection by PPMs.

DETAILED DESCRIPTION

Figure 1:
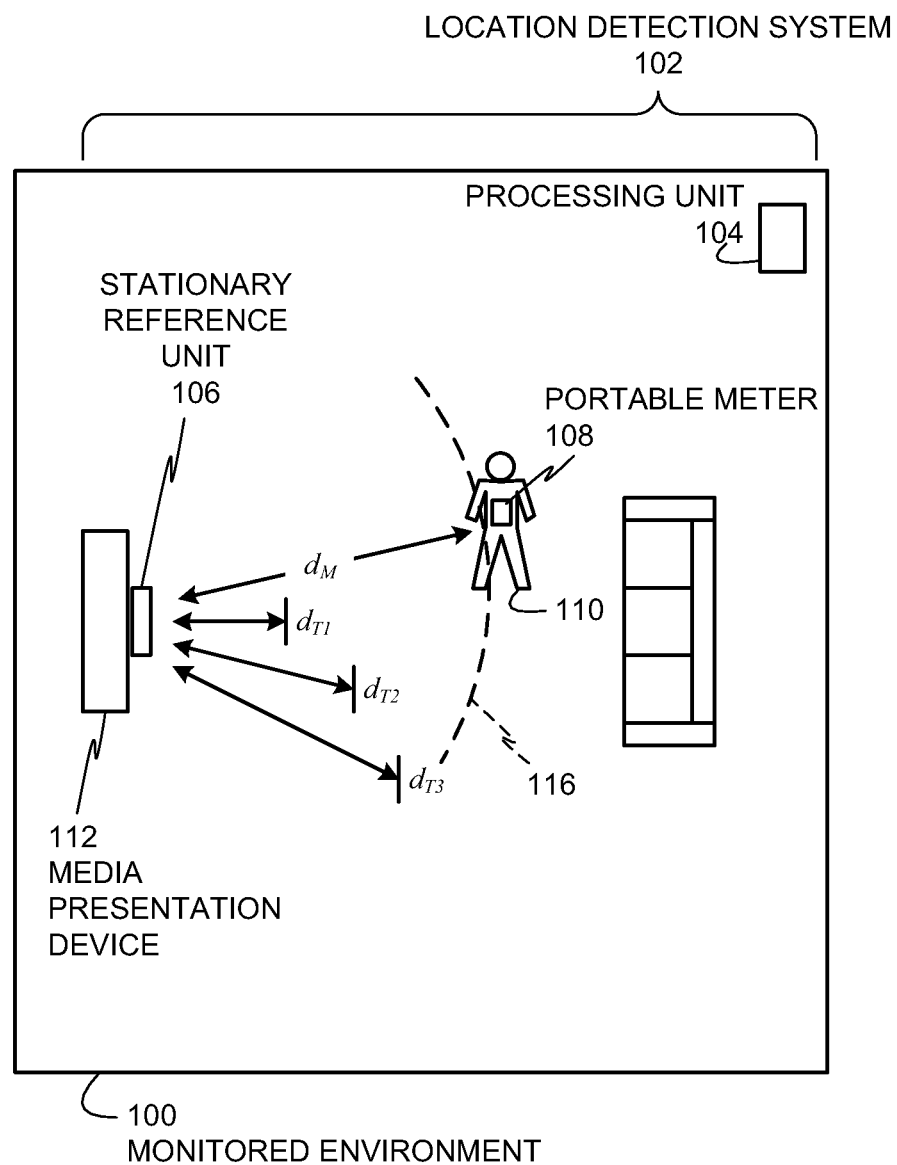
FIG. 1 depicts an example monitored environment in which locations of audience members may be detected.

Example methods, apparatus, systems, and articles of manufacture disclosed herein determine locations of audience members in monitored environments. Such audience member location information may be advantageously used to determine whether audience members were located sufficiently proximate to media devices (e.g., televisions, radios, computers, etc.) to have been exposed to media content presented by those media devices.

Example methods, apparatus, systems, and articles of manufacture disclosed herein involve using neural network models to determine locations of audience members. To implement location detection techniques, an example location detection system is installed at a home or other monitored environment (e.g., an office, a commercial establishment, a restaurant, a bar, a retail store, etc.) and calibrated for that environment. The location detection system includes a reference unit that operates as a stationary audio detector and a portable unit that operates as a portable audio detector. The reference unit includes a microphone and is positioned at a fixed location in the monitored environment. The portable unit also includes a microphone and is worn or carried by an audience member as the audience member moves in the monitored environment. During a calibration process, a neural network model of the location detection system is trained based on known distances between the reference unit and one or more audio emitters (e.g., speakers) of one or more media devices in the monitored environment and known distances between the portable unit and the audio emitter(s). The known distances and amplitude characteristics of audio detected at the reference and portable units are input to the neural network model.

After calibration of the location detection system, and during operation, an audience member carries or wears the portable unit. The portable unit digitizes any detected audio and communicates the digitized audio samples to the location detection system, while the reference unit also detects and digitizes the same audio. The location detection system then correlates the portable unit audio samples (i.e., non-stationary audio samples) with the reference unit audio samples (i.e., reference audio samples) to find one or more correlation coefficients (e.g., maximum and/or minimum correlation coefficients). The correlation coefficients are then provided to the neural network model, which determines a distance from the portable unit to the source of the detected audio (e.g., a speaker of a media device that emitted the audio) based on its previous training.

The resulting distance measure provided by the neural network model can then be used to determine whether the audience member carrying or wearing the portable unit was sufficiently close to the media device that emitted the audio to credit corresponding media content (e.g., a television program, a radio program, an advertisement, Internet web content, computer content, or any other media content) with exposure to the audience member.

In some examples, the location detection system is configured to process acquired audio samples from the reference unit and acquired audio samples from the portable unit using time-domain analysis techniques to determine correlation coefficients. In other examples the location detection system is configured to use frequency-domain analysis to process the acquired audio samples to determine the correlation coefficients.

FIG. 1 depicts an example monitored environment 100 having an example location detection system 102 constructed in accordance with the teachings of this disclosure located therein. In the illustrated example, the location detection system 102 includes a processing unit 104 and a stationary reference unit 106. In the illustrated example, the location detection system 102 also includes or is in communication with a portable meter 108 carried or worn by a person 110 as the person 110 moves in the monitored environment 100. In the illustrated example, the location detection system 102 is configured to determine the location(s) of the person 110 relative to a media presentation device 112 in the monitored environment 100. In the illustrated example, the media presentation device 112 is a television, but it may alternatively be a stereo, a computer, a multi-media device, or any other media presentation device capable of presenting media content sought to be monitored for exposure to the person 110.

In the illustrated example, the stationary reference unit 106 is located next to or substantially close to the media presentation device 112 such that distances between the portable meter 108 and the media presentation device 112 are the same or substantially similar to distances between the portable meter 108 and the stationary reference unit 106. In this manner, distances determined by the location detection system 102 between the portable meter 108 and the stationary reference unit 106 are regarded as the same distances between the portable meter 108 and the media presentation device 112.

In the illustrated example, the stationary reference unit 106 operates as a stationary audio detector to detect audio emitted from the media presentation device 112 of the monitored environment 100. In the illustrated example, the stationary reference unit 106 digitizes the detected audio and stores time-stamped digitized audio samples of the detected audio. In other examples, the stationary reference unit 106 sends the detected audio in analog form to the processing unit 104 and the processing unit 104 digitizes and stores time-stamped digitized audio samples of the detected audio. In some examples, the stationary reference unit 106 is provided with a microphone to detect the audio emitted by the media presentation device 112. In other examples, the stationary reference unit 106 is provided with audio input port connectors to interface with audio output ports or speaker output connections of the media presentation device 112 via wires to receive audio reproduced by the media presentation device 112.

In the illustrated example, the portable meter 108 operates as a portable audio detector that also detects audio emitted from the media presentation device 112 in the monitored environment 100. The example portable meter 108 digitizes the detected audio and stores time-stamped digitized audio samples of the detected audio.

In the illustrated example, the processing unit 104 may be configured to determine monitored distances ($d_M$) between the person 110 and the media presentation device 112 in real-time or near real-time as the processing unit 104 receives audio samples from the stationary reference unit 106 and the portable meter 108. Additionally or alternatively, the processing unit 104 may be configured to determine the monitored distances ($d_M$) during a post-process.

In the illustrated example, the example processing unit 104 determines locations of the person 110 by calculating monitored distances ($d_M$) between the person 110 and the media presentation device 112 based on time-of-flight delays of audio emissions from the media presentation device 112. That is, the time-of-flight of audio emissions characterized by the speed of sound will cause an audio emission from the media presentation device 112 to be received at different times by the stationary reference unit 106 and the portable meter 108 when they are located at different distances from the media presentation device 112. In the illustrated example, the stationary reference unit 106 and the portable meter 108 timestamp their respective digitized audio samples to indicate times at which they detected corresponding audio. The processing unit 104 subsequently uses such timestamps to determine delays between the times at which the stationary reference unit 106 received audio emissions and the times at which the portable meter 108 received the same audio emissions. The processing unit 104 can then use the measured delays to determine monitored distances ($d_M$) corresponding to the locations of the person 110.

The stationary reference unit 106 and the portable meter 108 periodically or aperiodically send their time-stamped digitized audio samples to the processing unit 104. The processing unit 104 of the illustrated example may be implemented in a number of different ways. For example, the processing unit 104 may be implemented by the example apparatus 200 of FIG. 2 to determine locations of the person 110 using time-domain analyses of the time-stamped digitized audio samples and/or by the example apparatus 300 of FIG. 3 to determine locations of the person 110 using frequency-domain analyses of the time-stamped digitized audio samples.

In the illustrated example, the processing unit 104 includes a neural network model. Example neural network models are described below in connection with FIGS. 2 and 3. During installation of the location detection system 102 in the monitored environment 100 and prior to use, the processing unit 104 is calibrated with training data associated with known training distances to train the neural network model to determine location information associated with the person 110. In particular, during a calibration process, media content is presented via the media presentation device 112 to cause audio emissions therefrom. Throughout the collection process, the stationary reference unit 106 detects the audio emissions and generates corresponding time-stamped digitized reference audio samples. In addition, the portable meter 108 is moved to different locations in the monitored environment 100 shown in FIG. 1 as located at known training distances ($d_{T1}$), ($d_{T2}$), and ($d_{T3}$) from the media presentation device 112 (and, thus, from the stationary reference unit 106). At each of the training distances ($d_{T1}$), ($d_{T2}$), and ($d_{T3}$), the portable meter 108 detects the audio emissions from the media presentation device 112 and generates corresponding time-stamped digitized non-stationary audio samples.

In the illustrated example, the stationary reference unit 106 and the mobile meter 108 send their respective time-stamped digitized audio samples to the processing unit 104 through wireless or wired mediums. The processing unit 104 is also provided with the training distances ($d_{T1}$), ($d_{T2}$), and ($d_{T3}$) and indications of times at which the portable meter 108 was located at the training distances ($d_{T1}$), ($d_{T2}$), and ($d_{T3}$). To train the neural network model to accurately determine locations of the person 110 based on subsequent audio collection processes, the processing unit 104 provides its neural network model with a distance value for each training distance ($d_{T1}$), ($d_{T2}$), and ($d_{T3}$) and processes audio sample sets from the stationary reference unit 106 and the portable meter 108 (e.g., digitized reference and non-stationary audio sample sets collected when the portable meter 108 was located at the respective training distances ($d_{T1}$), ($d_{T2}$), and ($d_{T3}$)) to provide the neural network with correlation coefficients for each of the training distances ($d_{T1}$), ($d_{T2}$), and ($d_{T3}$)). In this manner, the neural network model can be trained to correlate the training distances ($d_{T1}$), ($d_{T2}$), and ($d_{T3}$) with the correlation coefficient results associated with the digitized audio samples to subsequently determine accurate location information when the person 110 is located at different distances from the media presentation device 112.

In the illustrated example, location information refers to locations of the person 110 relative to the media presentation device 112. That is, the processing unit 104 determines distances separating the person 110 from the media presentation device 112 such that the person 110 may be located at any position along a circumference about the media presentation device 112 having a radius equal to the determined distance. In the illustrated example of FIG. 1, when the processing unit 104 subsequently determines that the person 110 was located at a monitored distance ($d_M$) from the media presentation device 112, the person 110 may have been located anywhere along a circumference 116 having a radius equal to the monitored distance ($d_M$) about the media presentation device 112.

Figure 2:
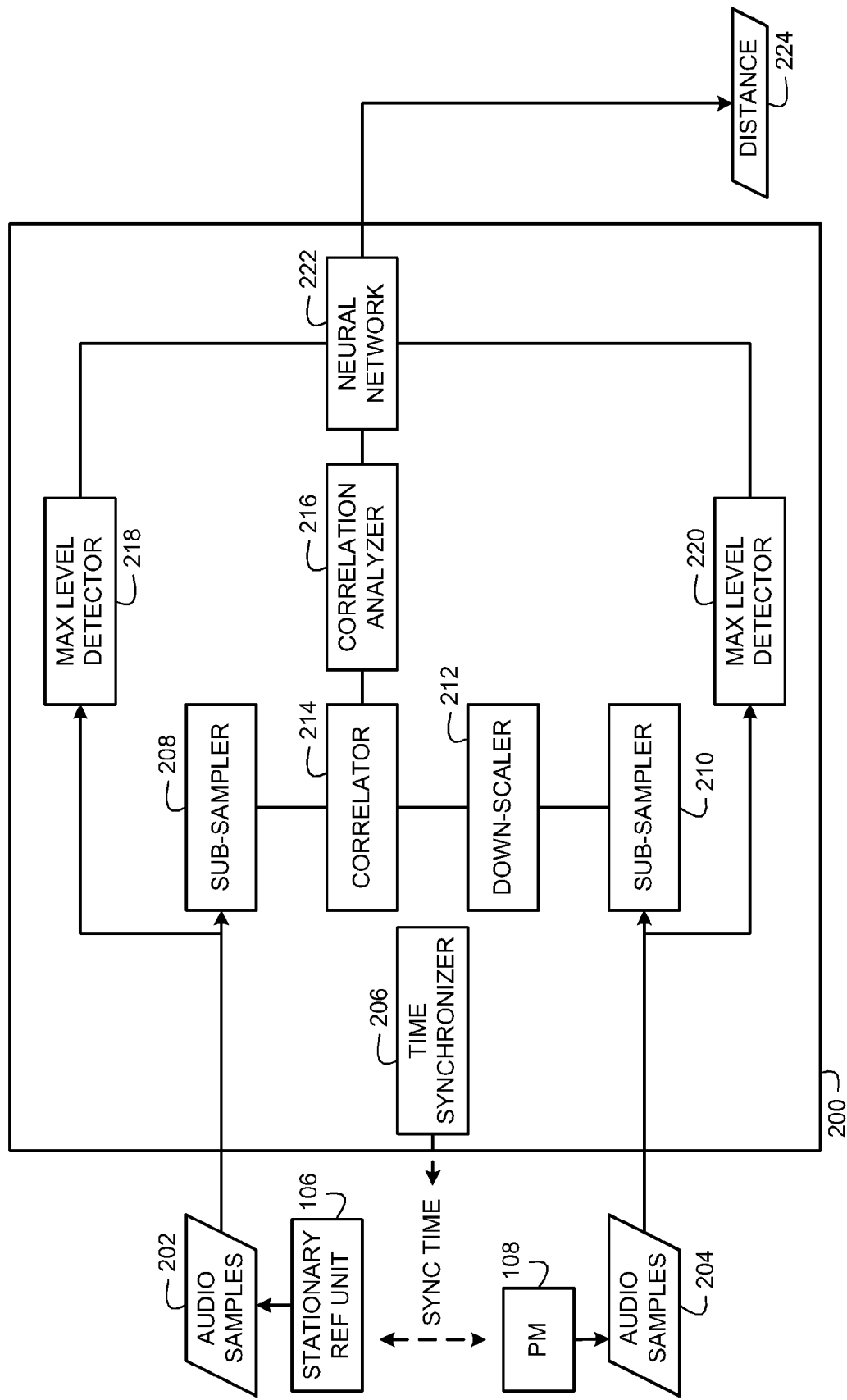
FIG. 2 depicts an example apparatus constructed in accordance with the teachings of this disclosure and that may be used to detect locations of audience members in the monitored environment of FIG. 1 based on time-domain analyses.

FIG. 2 depicts an example apparatus 200 that may be used to implement the example processing unit 104 of FIG. 1 to detect locations of audience members in the monitored environment 100 of FIG. 1 based on time-domain signal analyses. In the illustrated example, the apparatus 200 is in communication with the stationary reference unit 106 to receive digitized reference audio samples 202 and in communication with the portable meter (PM) 108 to receive digitized non-stationary audio samples 204. To synchronize clocks in the stationary reference unit 106 and the portable meter 108 with one another, the apparatus 200 is provided with an example time synchronizer 206. In the illustrated example, the time synchronizer 206 configures the stationary reference unit 106 and the portable meter 108 to have the same time so that timestamps of the reference audio samples 202 from the stationary reference unit 106 correspond to the same timestamps (or substantially the same timestamps within an acceptable error tolerance (e.g., +/− number of milliseconds)) of the non-stationary audio samples 204 from the portable meter 108. Ensuring that reference audio samples 202 from the stationary reference unit 106 correspond in time with respective ones of the non-stationary audio samples 204 from the portable meter 108 facilitates correlation processes performed on the audio samples 202 and 204 by the apparatus 200. In the illustrated example, the time synchronizer 206 can communicate with the stationary reference unit 106 and the portable meter 108 through wired or wireless communications to set clocks therein with the same (or substantially the same) time.

In the illustrated example, to sub-sample (or down-sample) the reference audio samples 202 from the stationary reference unit 106, the apparatus 200 is provided with a sub-sampler 208. In addition, to sub-sample the non-stationary audio samples 204 from the portable meter 108, the apparatus 200 is provided with a second sub-sampler 210. In the illustrated example, the sub-samplers 208 and 210 reduce the effective sampling rate at which the received digitized audio samples are represented. For example, if the stationary reference unit 106 and the portable meter 108 sample audio at 44 kHz, the sub-samplers 208 and 210 may select every other sample of the received digitized audio samples, which results in an effective sampling rate of 22 kHz. Sub-sampling reduces the size of the audio data sets to be processed by the apparatus 200, while maintaining the duration or the period over which the samples were collected and maintaining sufficient audio quality for determining audience member location information. In addition, the sub-sampling advantageously allows the apparatus 200 to process the digitized audio samples faster by reducing the amount of data that must be processed. In the illustrated example, the sub-samplers 208 and 210 perform 20:1 sub-sampling processes to reduce digitized audio sample sets by a factor of 20.

In the illustrated example, to reduce the quantization or digitization resolution of the non-stationary audio samples 204 from the portable meter 108, the apparatus 200 is provided with an example down-scaler 212. In the illustrated example, the down-scaler 212 is configured to reduce the number of bits used to represent each audio sample of the non-stationary audio samples 204. In the illustrated example, the down-scaler 212 down-scales audio samples from 16-bit representations to 8-bit representations. The example apparatus 200 is provided with the down-scaler 212 to normalize the bit-resolutions of the non-stationary audio samples 204 from the portable meter 108 to match the bit-resolutions of the reference audio samples 202 from the stationary reference unit 106, because the stationary reference unit 106 of the illustrated example digitizes audio at the lower, 8-bit quantization resolution. In other examples in which the portable meter 108 and the stationary reference unit 106 digitize audio using the same bit resolution, the down-scaler 212 is omitted. In yet other examples in which the stationary reference unit 106 digitizes audio using a higher bit resolution than the portable meter 108, the down-scaler 212 is used to down-scale the reference audio samples 202 from the stationary reference unit 106, rather than the non-stationary audio samples 204 from the portable meter 108.

In the illustrated example, to perform correlations between the audio samples 202 and 204, the apparatus 200 is provided with an example correlator 214. In the illustrated example, the correlator 214 determines correlation coefficients (e.g., correlation analysis results) based on correlations between audio sample subsets 402 and 404 (FIGS. 4A-4C) generated by the sub-samplers 208 and 210 and the down-scaler 212 based on the reference audio samples 202 and the non-stationary audio samples 204. The correlator 214 of the illustrated example receives a subset of reference audio samples 402 from the sub-sampler 208 and a subset of non-stationary audio samples 404 from the down-scaler 212.

Figure 4A:
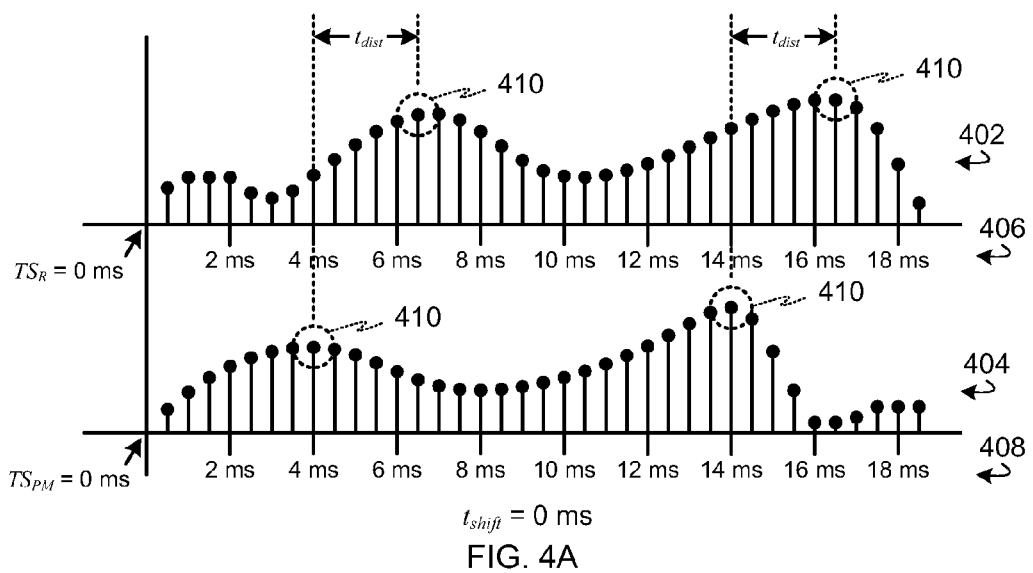
FIGS. 4A-4C depict reference and non-stationary audio sample sets at different time-shift positions relative to one another.
Figure 4B:
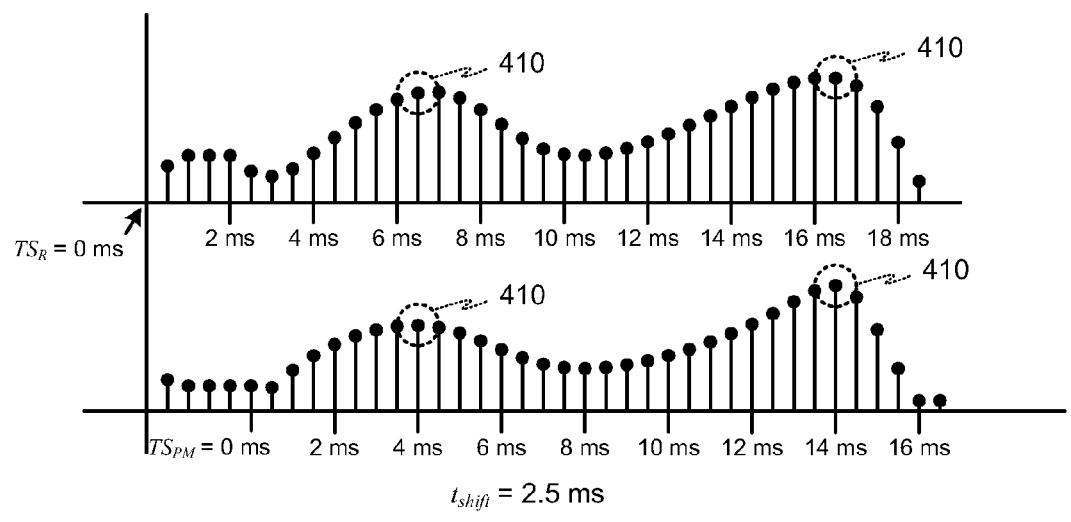
Figure 4C:
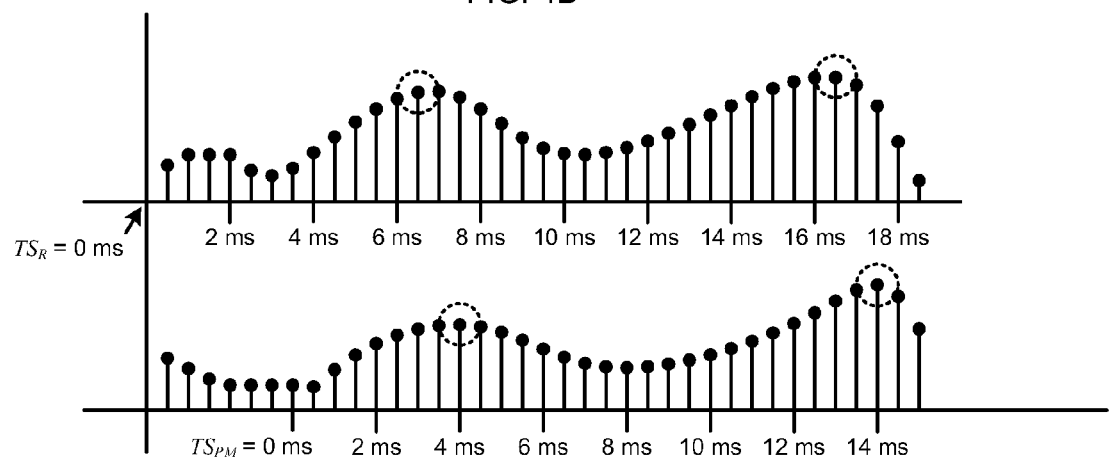

Turning to FIGS. 4A-4C, the correlator 214 aligns the reference audio sample subset 402 with the non-stationary audio sample subset 404 based on respective timestamps 406 and 408. As shown in FIG. 4A, the time-aligned subsets 402 and 404 exhibit corresponding similar characteristics 410 that are offset from one another by a measured distance time offset ($t_{dist}$). In some examples described herein, the measured distance time offset ($t_{dist}$) corresponds to the monitored distance ($d_M$) between the person 110 and the media presentation device 112 shown in FIG. 1.

To determine the measured distance time offset ($t_{dist}$), the correlator 214 determines multiple correlation coefficients by performing correlations between the reference and non-stationary audio sample subsets 402 and 404. For each correlation coefficient calculation, the correlator 214 time-shifts the audio sample subsets 402 and 404 relative to one another by incremental time shifts to different time-shift positions ($t_{shift}$) as shown in FIGS. 4A, 4B, and 4C such that at one of the time-shift positions ($t_{shift}$) (e.g., the time shift position ($t_{shift}$) shown in FIG. 4B) the similar characteristics 410 between the audio sample subsets 402 and 404 are close in alignment or substantially aligned with one another to produce a very strong correlation coefficient. In the illustrated examples, the strongest correlation between the audio sample subsets 402 and 404 occurs at the time shift position equal to 2.5 milliseconds (ms) ($t_{shift}$=2.5 ms) of FIG. 4B as represented by the notation below the timeline of the shown graph.

In some examples, the correlator 214 initially aligns the reference audio sample subset 402 to be negatively shifted in time relative to the non-stationary audio sample subset 404. The correlator 214 then performs a time-shift sweep of the audio sample subsets 402 and 404 relative to one another when calculating the correlation coefficients such that the timestamps 406 and 408 of the audio sample subsets 402 and 404 become matchingly aligned at a subsequent time-shift and, at yet a further time-shift, the reference audio sample subset 402 becomes positively shifted in time relative to the non-stationary audio sample subset 404. For each time-shift, the correlator 214 associates a corresponding correlation coefficient with the corresponding time-shift position ($t_{shift}$) between the timestamps 406 and 408 of correspondingly aligned audio samples. For the time-shift at which the similar characteristics 408 are aligned with one another, as indicated by the very strongest correlation coefficient, the measured distance time offset ($t_{dist}$) (e.g., the measured distance time offset ($t_{dist}$) shown in FIG. 4A) is substantially equal to the time-shift position ($t_{shift}$) of that time shift.

Although only three time-shifts are shown in FIGS. 4A-4C, in the illustrated example, the correlator 214 determines correlation coefficients for the audio sample subsets 402 and 404 based on more time-shifts. In addition, the time-shifts may be based on finer or coarser time steps (e.g., 0.2 ms increments, 0.5 ms increments, 1 ms increments, 2 ms increments, 5 ms increments, etc.).

In the illustrated example, to determine correlation coefficients based on time-domain analyses, the correlator 214 may elect to use one of Equation 1 or Equation 2 below based on whether the average of one or both of the audio samples 202 and 204 is equal to zero (i.e., whether the audio samples 202 and 204 have DC biases). In the illustrated example, the average of an audio sample set is equal to zero when it does not have a direct current (DC) bias. Such a DC bias may be eliminated from an audio signal using a high-pass filter or any other suitable filtering process such as, for example, a moving average process. For example, one or both of the stationary reference unit 106 and/or the portable meter 108 may be provided with a respective high-pass filter (or any other suitable filter) to remove DC bias from a detected audio signal prior to digitizing the signal to produce the audio samples 202 and/or 204.

In the illustrated example, the correlator 214 uses Equation 1 below to perform a correlation between the reference and non-stationary audio samples 202 and 204 and determine a correlation coefficient (r) when the averages of both of the audio samples 202 and 204 are equal to zero (i.e., neither of the audio samples 202 and 204 contain a DC bias). In such instances, the stationary reference unit 106 and the portable meter 108 used high-pass filters (or other suitable filters to remove DC biases) to filter audio signals corresponding to the reference and non-stationary audio samples 202 and 204.

$$r = \frac{\sum xy}{\sqrt{(\sum x^2)(\sum y^2)}} \quad \text{Equation 1}$$

Using Equation 1 above, the correlator 214 determines a correlation coefficient (r) (e.g., a correlation analysis result) by performing three summations ($\Sigma xy$, $\Sigma x^2$, $\Sigma y^2$) based on the reference and non-stationary audio samples 202 and 204. An example process that may be used by the correlator 214 to determine correlation coefficients (r) based on Equation 1 is described below in connection with the example flow diagram of FIG. 7.

In the illustrated example, the correlator 214 uses Equation 2 below to perform a correlation between the reference and non-stationary audio samples 202 and 204 and determine a correlation coefficient (r) when the average of the reference audio samples 202 is zero (i.e., the reference audio samples 202 have no DC bias) and the average of the non-stationary audio samples 204 is not equal to zero (i.e., the non-stationary audio samples 204 have a DC bias). In such instances, the stationary reference unit 106 used a high-pass filter (or other suitable filter to remove a DC bias) to filter an audio signal corresponding to the reference audio samples 202.

$$r = \frac{n\sum xy}{\sqrt{n(\sum x^2)}\sqrt{n(\sum y^2) - (\sum y)^2}} \quad \text{Equation 2}$$

Using Equation 2 above, the correlator 214 determines a correlation coefficient (r) (e.g., a correlation analysis result) using four summations ($\Sigma xy$, $\Sigma x^2$, $\Sigma y^2$, $\Sigma y$) based on the reference and non-stationary audio samples 202 and 204. An example process that may be used by the correlator 214 to determine correlation coefficients (r) based on Equation 2 is described below in connection with the example flow diagram of FIGS. 8A and 8B.

In the illustrated example, Equations 1 and 2 may be derived from known Equation 3 below when the respective conditions noted above regarding DC biases of the reference and non-stationary audio samples 202 and 204 are true.

$$r = \frac{n\sum xy - (\sum x)(\sum y)}{\sqrt{n(\sum x^2) - (\sum x)^2}\sqrt{n(\sum y^2) - (\sum y)^2}} \quad \text{Equation 3}$$

In some examples, Equation 3 may be used to determine correlation coefficients (r) (e.g., a correlation analysis results) when it is unknown whether a DC bias is present in either of the audio samples 202 and 204 and/or when DC biases are present in both of the audio samples 202 and 204.

As shown in FIG. 2, to analyze and select ones of the correlation coefficients (r) determined using Equation 1, Equation 2, and/or Equation 3 above, the apparatus 200 is provided with a correlation analyzer 216. In the illustrated example, the correlation analyzer 216 receives correlation coefficients (r) and corresponding time-shift positions ($t_{shift}$) determined by the correlator 214 based on multiple time shifts of the reference and non-stationary audio sample subsets 402 and 404 of FIGS. 4A-4C. In the illustrated example, the correlation analyzer 216 compares the correlation coefficients (r) to one another and selects the three maximum or peak coefficients ($r_{max}$) and three minimum or valley coefficients ($r_{min}$). In the illustrated example, the three maximum coefficients ($r_{max}$) are coefficients that have the largest values relative to the other correlation coefficients (r) for corresponding reference and non-stationary audio sample subsets 402 and 404, and the three minimum coefficients ($r_{min}$) are coefficients that have the smallest values relative to the other correlation coefficients (r) for corresponding reference and non-stationary audio sample subsets 402 and 404. In other examples, fewer or more maximum coefficients ($r_{max}$) and minimum coefficients ($r_{min}$) may be selected.

In the illustrated example of FIG. 2, to select a maximum-amplitude audio sample from the reference audio samples 202, the apparatus 200 is provided with an example maximum level detector 218. The example maximum level detector 218 selects an audio sample having the largest amplitude from the reference audio samples 202 over a time period of interest and stores a value corresponding to its amplitude. In addition, to select a maximum-amplitude audio sample from the non-stationary audio samples 204, the apparatus 200 is provided with another example maximum level detector 220. The example maximum level detector 220 selects an audio sample having the largest amplitude from the non-stationary audio samples 204 over a time period of interest and stores a value corresponding to its amplitude.

In the illustrated example of FIG. 2, to determine the monitored distance ($d_M$) of the person 110 from the media presentation device 112 of FIG. 1, the apparatus 200 is provided with a neural network 222. The neural network 222 receives the three maximum coefficients ($r_{max}$), the three minimum coefficients ($r_{min}$), and corresponding time-shift positions ($t_{shift}$) from the correlation analyzer 216. In addition, the neural network 222 receives a maximum-amplitude reference audio sample value from the maximum level detector 218 and a maximum-amplitude non-stationary audio sample value from the maximum level detector 220. In the illustrated example, the neural network 222 implements a neural network model that is previously trained based on the known training distances ($d_{T1}$), ($d_{T2}$), and ($d_{T3}$) as discussed above in connection with FIG. 1 to generate distance measures such as the monitored distance ($d_M$). Thus, in the illustrated example, the neural network 222 applies its previously trained neural network model to the three maximum coefficients ($r_{max}$), the three minimum coefficients ($r_{min}$), corresponding time-shift positions ($t_{shift}$), the maximum-amplitude reference audio sample value, and the maximum-amplitude non-stationary audio sample value to determine a distance result 224 (e.g., the monitored distance ($d_M$) of FIG. 1).

Figure 3:
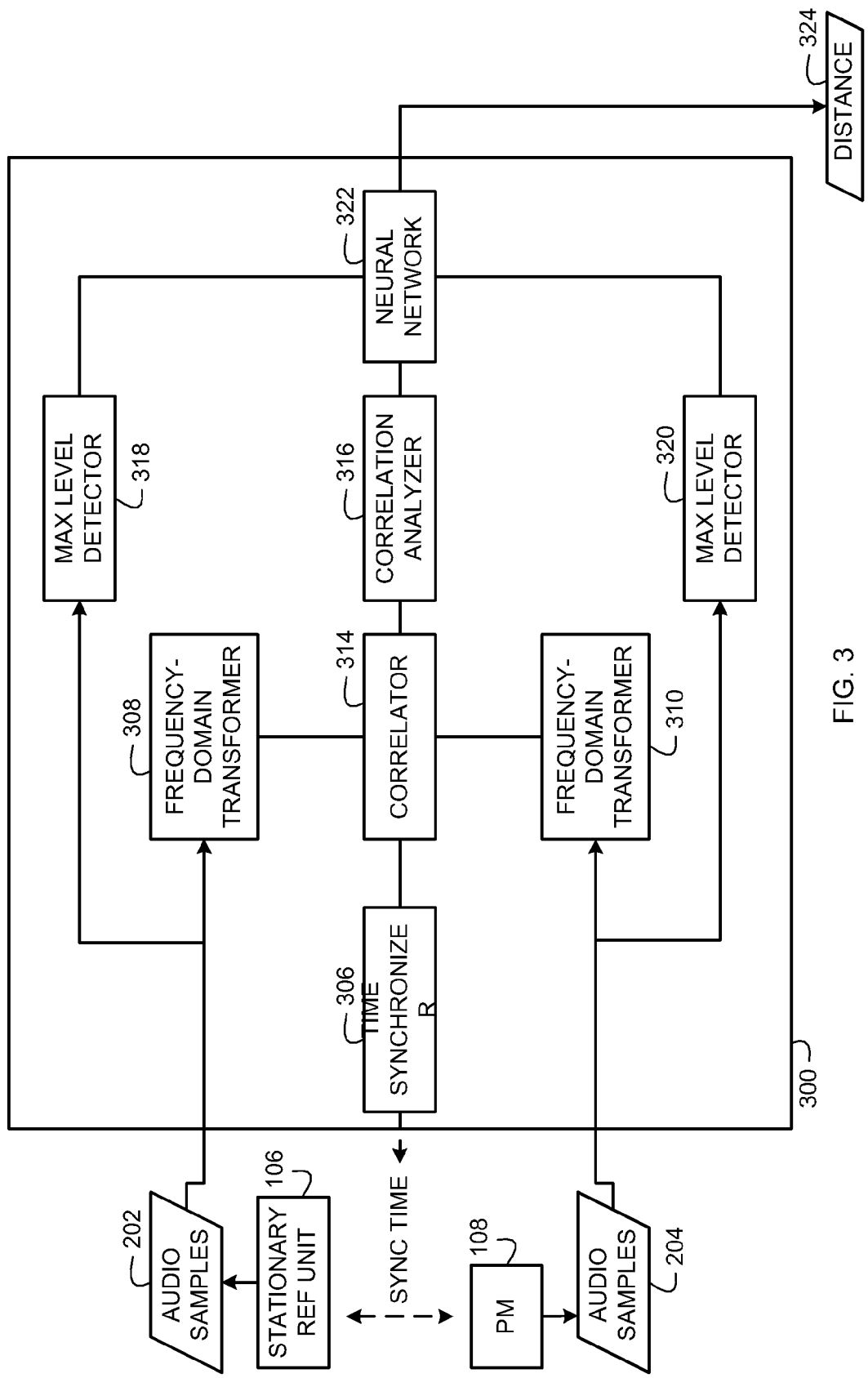
FIG. 3 depicts another example apparatus constructed in accordance with the teachings of this disclosure and that may be used to detect locations of audience members in the monitored environment of FIG. 1 based on frequency-domain analyses.

FIG. 3 depicts another example apparatus 300 that may be used to implement the example processing unit 104 to detect locations of audience members in the monitored environment 100 of FIG. 1 based on frequency-domain analyses. In the illustrated example, the apparatus 300 is in communication with the stationary reference unit 106 to receive the digitized reference audio samples 202 and in communication with the portable meter (PM) 108 to receive the digitized non-stationary audio samples 204. To synchronize clocks in the stationary reference unit 106 and the portable meter 108 with one another as discussed above in connection with FIG. 2, the apparatus 300 is provided with an example time synchronizer 306, which is substantially similar or identical to the time synchronizer 206 of FIG. 2.

In the illustrated example, to convert the reference audio samples 202 from the time domain to the frequency domain, the apparatus 300 is provided with an example frequency-domain transformer 308. In addition, to convert the non-stationary audio samples 204 to the frequency domain, the apparatus 300 is provided with another example frequency-domain transformer 310. In the illustrated example, the frequency-domain transformers 308 and 310 determine fast Fourier transforms (FFTs) of audio samples to enable frequency domain analyses of the same.

In the illustrated example, the apparatus 300 is not provided with sub-samplers (e.g., the sub-samplers 208 and 210 of FIG. 2). The example apparatus 300 can perform frequency domain analyses based on a full audio sample sets collected during a shorter duration by the stationary reference unit 106 and the portable unit 108, whereas the apparatus 200 performs time-domain analyses on audio sample sets collected during longer durations and uses the sub-samplers 208 and 210 to reduce the size of the audio sample sets. In the illustrated examples disclosed herein, the quantity of audio samples collected by each of the stationary reference unit 106 and the portable meter 108 is based on the desired size of a correlation window and time-shift range for determining correlation coefficients (r). In examples using the example apparatus 200 of FIG. 2 to perform time-domain analyses, each of the stationary reference unit 106 and the portable meter 108 may collect 750 ms of audio samples plus an additional quantity of audio samples equal to twice the duration of the desired time-shift range. In such examples, the sub-samplers 208 and 210 are then used to reduce quantities of samples while maintaining the duration over which the audio samples were acquired. In other examples using the example apparatus 300 of FIG. 3 to perform frequency-domain analyses, each of the stationary reference unit 106 and the portable meter 108 may collect 32 ms of audio samples plus an additional quantity of audio samples equal to twice the duration of the desired time-shift range. The example apparatus 300 does not employ sub-sampling of the acquired audio samples for frequency-domain analyses, because the number of audio samples acquired during the relatively shorter duration is already of a smaller, more manageable quantity compared to the number of audio samples collected by the stationary reference unit 106 and the portable meter 108 for time-domain analyses. Frequency-domain analyses may be advantageously used to improve battery charge performance of the portable meter 108, because less audio samples are acquired for frequency-domain analyses to achieve similar results as those produced using time-domain analyses.

Referring again to FIG. 3, to perform correlations between frequency-domain representations of the audio samples 202 and 204, the apparatus 300 is provided with an example correlator 314. In the illustrated example, the frequency-domain transformers 308 and 310 and the correlator 314 work cooperatively to frequency-correlate multiple time-shifted instances of the reference and non-stationary audio samples 202 and 204. In this manner, the correlator 314 may determine multiple correlation coefficients, each corresponding to a different time-shifted instance of the audio samples 202 and 204. For example, turning briefly to FIG. 5, the frequency domain transformer 308 is shown as generating multiple reference frequency transforms 502, each corresponding to a respective one of a 0 ms time-shift position ($t_{shift}$=0 ms), a 2.5 ms time-shift position ($t_{shift}$=2.5 ms), and a 3.5 ms time-shift position ($t_{shift}$=3.5 ms). In addition, the frequency-domain transformer 310 is shown as generating multiple non-stationary frequency transforms 504, each corresponding to a respective one of the 0 ms time-shift position ($t_{shift}$=0 ms), the 2.5 ms time-shift position ($t_{shift}$=2.5 ms), and the 3.5 ms time-shift position ($t_{shift}$=3.5 ms). For the frequency-domain transforms performed by the frequency-domain transformers 308 and 310, the time shifting is performed in similar fashion as described above in connection with FIGS. 4A-4C. Thus, the time shift positions ($t_{shift}$) of the audio samples 202 and 204 are substantially similar or identical to the time shift positions shown in FIGS. 4A-4C. Although three time shifts are noted ($t_{shift}$=0 ms, $t_{shift}$=2.5 ms, and $t_{shift}$=3.5 ms), the correlator 314 may determine correlation coefficients (r) for any other quantity of time shifts.

Figure 5:
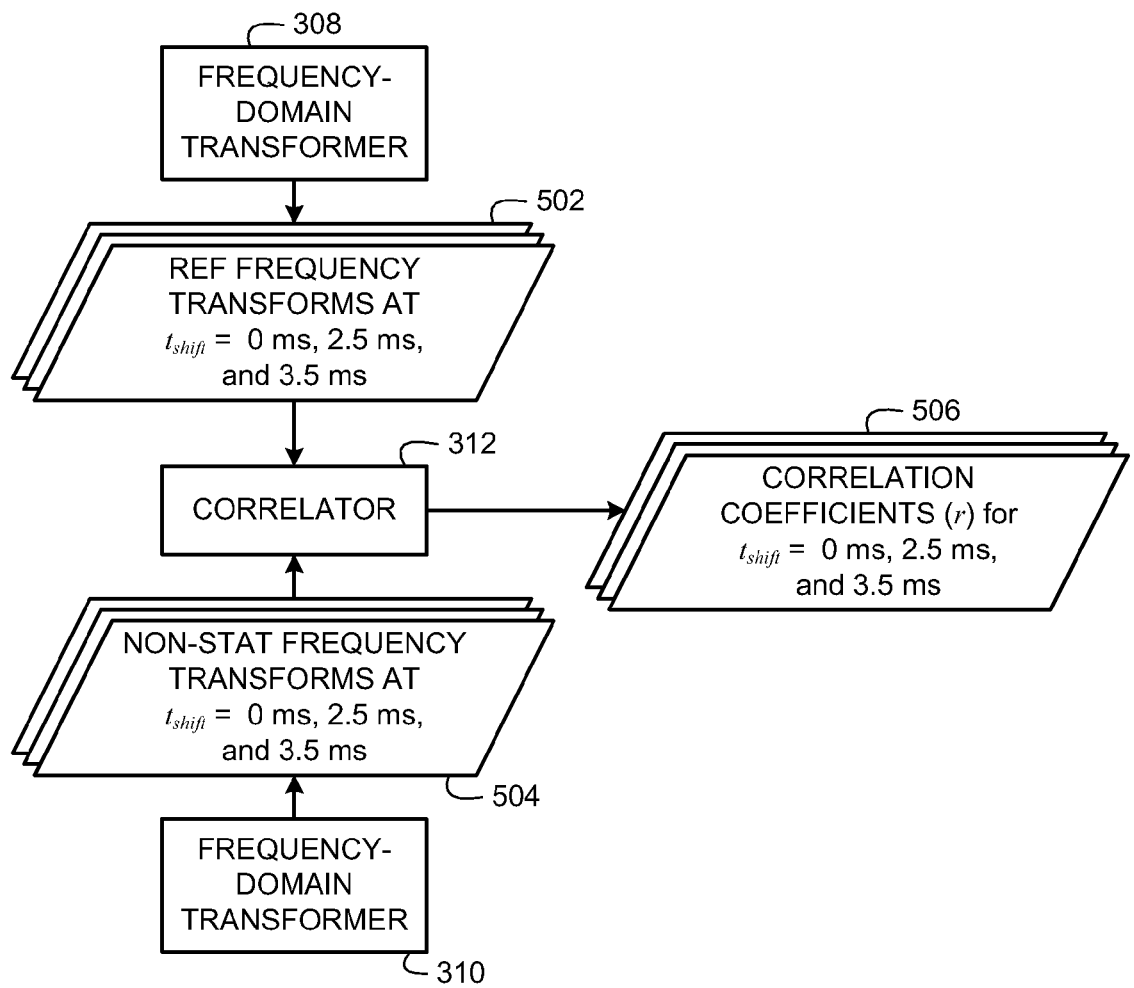
FIG. 5 depicts an example correlator of the example apparatus of FIG. 3 determining correlation coefficients based on frequency-domain representations of the reference and non-stationary audio sample sets of FIG. 3.

In the illustrated example of FIG. 5, for each time-shift position ($t_{shift}$), the correlator 314 determines frequency-based correlation coefficients (r) 506 for the multiple frequency-domain representations 502 and 504. In the illustrated example, the correlator 314 may use Equation 4 or Equation 5 below to determine the frequency-based correlation coefficients (r) 506. In particular, the correlator 314 may elect to use one of Equation 4 or Equation 5 below based on whether the average of one or both of the audio samples 202 and 204 is equal to zero (i.e., whether either or both of the audio samples 202 and 204 have DC biases). In the illustrated example, the average of an audio sample set is equal to zero when it does not have a direct current (DC) bias. Such a DC bias may be eliminated from an audio signal using a high-pass filter or any other suitable filtering process such as, for example, a moving average process. For example, one or both of the stationary reference unit 106 and/or the portable meter 108 may be provided with a respective high-pass filter (or any other suitable filter) to remove DC bias from a detected audio signal prior to digitizing the signal to produce the audio samples 202 and/or 204.

In the illustrated example, the correlator 314 uses Equation 4 below to perform frequency-based correlations between different time-shift position ($t_{shift}$) instances of the reference and non-stationary audio samples 202, 204 and to determine respective correlation coefficients (r) when the averages of both of the audio samples 202 and 204 are equal to zero (i.e., neither of the audio samples 202 and 204 contains a DC bias). In such instances, the stationary reference unit 106 and the portable meter 108 used high-pass filters (or other suitable filters to remove DC biases) to filter audio signals corresponding to the reference and non-stationary audio samples 202 and 204.

$$r = \frac{\sum XY^*}{\sqrt{(\sum XX^*) - (\sum YY^*)}} \quad \text{Equation 4}$$

Using Equation 4 above, the correlator 314 determines a correlation coefficient (r) (e.g., a correlation analysis result) by performing three summations ($\Sigma XY^*$, $\Sigma XX^*$, $\Sigma YY^*$) based on the complex conjugate pairs (X,X*) and (Y,Y*) of frequency-domain representations 502 and 504 (FIG. 5) of the reference and non-stationary audio samples 202 and 204. An example process that may be used by the correlator 314 of FIG. 3 to determine correlation coefficients (r) based on Equation 4 is described below in connection with the example flow diagram of FIG. 9.

In the illustrated example, the correlator 314 uses Equation 5 below to perform frequency-based correlations between different time-shift position ($t_{shift}$) instances of the reference and non-stationary audio samples 202, 204 and to determine respective correlation coefficients (r) when the average of the reference audio samples 202 is zero (i.e., the reference audio samples 202 have no DC bias), but the average of the non-stationary audio samples 204 is not equal to zero (i.e., the non-stationary audio samples 204 have a DC bias). In such instances, the stationary reference unit 106 used a high-pass filter (or other suitable filter to remove a DC bias) to filter an audio signal corresponding to the reference audio samples 202.

$$r = \frac{n\sum XY^*}{\sqrt{n(\sum XX^*)}\sqrt{n(\sum YY^*) - (\sum Y)(\sum Y)^*}} \quad \text{Equation 5}$$

Using Equation 5 above, the correlator 314 determines a correlation coefficient (r) (e.g., a correlation analysis result) using four summations ($\Sigma XY^*$, $\Sigma XX^*$, $\Sigma YY^*$, $\Sigma Y$) based on the complex conjugate pairs (X,X*) and (Y,Y*) of frequency-domain representations 502 and 504 (FIG. 5) of the reference and non-stationary audio samples 202 and 204. An example process that may be used by the correlator 314 of FIG. 3 to determine correlation coefficients (r) based on Equation 5 is described below in connection with the example flow diagram of FIGS. 10A-10C.

In the illustrated example, Equations 4 and 5 may be derived from Equation 6 below when the respective conditions noted above regarding DC biases of the reference and non-stationary audio samples 202 and 204 are true.

$$r = \frac{n\sum (XY^*) - (\sum X)(\sum Y^*)}{\sqrt{n(\sum XX^*)}\sqrt{(\sum X)(\sum X)^*}} \quad \text{Equation 6}$$
$$\sqrt{n(\sum YY^*) - (\sum Y)(\sum Y)^*}$$

In some example implementations, Equation 6 may be used to determine correlation coefficients (r) (e.g., correlation analysis results) when it is unknown whether a DC bias is present in either of the audio samples 202 and 204 and/or when DC biases are present in both of the audio samples 202 and 204. An example process that may be used by the correlator 314 of FIG. 3 to determine correlation coefficients (r) based on Equation 6 is described below in connection with the example flow diagram of FIGS. 11A-11C.

For frequency-domain analyses using Equations 4-6 above, the correlation coefficients (r) may be represented in polar coordinate notation (i.e., $r = \rho \angle \theta$), in which the correlation coefficients (r) are expressed as a magnitude ($\rho$) at a phase difference ($\theta$) between the two audio signals. In some examples in which phase distortion between audio signals is small (e.g., minimal) or can otherwise be ignored (e.g., there is no interest in taking phase distortion into account or no interest in analyzing phase delay), the correlation coefficients (r) may be represented using the magnitude ($\rho$) without the phase difference ($\theta$).

As shown in FIG. 3, to analyze and select ones of the correlation coefficients (r) determined using Equation 4, Equation 5, and/or Equation 6 above, the apparatus 300 is provided with a correlation analyzer 316. In the illustrated example, the correlation analyzer 316 receives correlation coefficients (r) and corresponding time-shift positions ($t_{shift}$) from the correlator 314 based on multiple time shifts of the reference and non-stationary audio samples 202 and 204 (e.g., similar to time-shift positions ($t_{shift}$) of the reference and non-stationary audio sample subsets 402 and 404 of FIGS. 4A-4C). In the illustrated example, the correlation analyzer 316 compares the correlation coefficients (r) to one another and selects the six maximum or peak coefficients ($r_{max}$). In the illustrated example, the six maximum coefficients ($r_{max}$) are coefficients that have the largest values relative to the other correlation coefficients (r) for corresponding reference and non-stationary audio samples 202 and 204. In other examples, fewer or more maximum coefficients ($r_{max}$) may be selected.

In the illustrated example of FIG. 3, to select a maximum-amplitude audio sample from the reference audio samples 202, the apparatus 300 is provided with an example maximum level detector 318. The example maximum level detector 318 selects an audio sample having the largest amplitude from the reference audio samples 202 over a time period of interest and stores a value corresponding to its amplitude. In addition, to select a maximum-amplitude audio sample from the non-stationary audio samples 204, the apparatus 300 is provided with another example maximum level detector 320. The example maximum level detector 320 selects an audio sample having the largest amplitude from the non-stationary audio samples 204 over a time period of interest and stores a value corresponding to its amplitude.

In the illustrated example of FIG. 3, to determine the monitored distance ($d_M$) of the person 110 of FIG. 1, the apparatus 300 is provided with a neural network 322. The neural network 322 receives the six maximum coefficients ($r_{max}$) and corresponding time-shift positions ($t_{shift}$) from the correlation analyzer 316. In addition, the neural network 322 receives a maximum-amplitude reference audio sample value from the maximum level detector 318 and a maximum-amplitude non-stationary audio sample value from the maximum level detector 320. In the illustrated example, the neural network 322 implements a neural network model that is previously trained based on the known training distances ($d_{T1}$), ($d_{T2}$), and ($d_{T3}$) as discussed above in connection with FIG. 1 to generate distance measures such as the monitored distance ($d_M$). Thus, in the illustrated example, the neural network 322 applies its previously trained neural network model to the six maximum coefficients ($r_{max}$), corresponding time-shift positions ($t_{shift}$), the maximum-amplitude reference audio sample value, and the maximum-amplitude non-stationary audio sample value to determine a distance result 324 (e.g., the monitored distance ($d_M$) of FIG. 1).

In some examples, the apparatus 200 of FIG. 2 and the apparatus 300 of FIG. 3 are both implemented in the processing unit 104 of FIG. 1. In such examples, the processing unit 104 is configured to determine which of the apparatus 200 or the apparatus 300 it should use based on whether it is to perform a time-domain analysis or a frequency-domain analysis of received audio samples (e.g., the audio samples 202 and 204 of FIGS. 2 and 3). For example, user-defined configurations may be set in the processing unit 104 to select between performance of time-domain or frequency-domain analyses based on any number and/or types of factors. Such factors may include the acoustic characteristics of the monitored environment 100, the size of the monitored environment 100, the device type of the media presentation device 112 (e.g., a stereo, a computer, a television, etc.), the speaker type of the media presentation device 112 (e.g., mixed range speakers, high-fidelity speakers, low-cost speakers, etc.), the processing power of the processing unit 104, the processing power of the stationary reference unit 106, the processing power of the portable meter 108, the battery capacity or other battery characteristics of the portable unit 108, etc.

In other examples, the processing unit 104 may be provided with only one of the apparatus 200 or the apparatus 300. In such examples, the processing unit 104 is configured to perform only time-domain analyses or perform only frequency-domain analyses.

While example manners of implementing the apparatus 200 and 300 have been illustrated in FIGS. 2 and 3, one or more of the elements, processes and/or devices illustrated in FIGS. 2 and 3 may be combined, divided, re-arranged, omitted, eliminated and/or implemented in any other way. Further, the time synchronizer 206, the sub-samplers 208 and 210, the down-scaler 212, the correlation analyzer 216, the neural network 222 and/or, more generally, the example apparatus 200 of FIG. 2 may be implemented by hardware, software, firmware and/or any combination of hardware, software and/or firmware. In addition, the time synchronizer 306, the frequency-domain transformers 308 and 310, the correlator 314, the correlation analyzer 316, the neural network 322 and/or, more generally, the example apparatus 300 of FIG. 3 may be implemented by hardware, software, firmware and/or any combination of hardware, software and/or firmware. Thus, for example, any of the time synchronizer 206, the sub-samplers 208 and 210, the down-scaler 212, the correlation analyzer 216, the neural network 222, the example apparatus 200, the time synchronizer 306, the frequency-domain transformers 308 and 310, the correlator 314, the correlation analyzer 316, the neural network 322 and/or the example apparatus 300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the time synchronizer 206, the sub-samplers 208 and 210, the down-scaler 212, the correlation analyzer 216, the neural network 222, the time synchronizer 306, the frequency-domain transformers 308 and 310, the correlator 314, the correlation analyzer 316, and/or the neural network 322 are hereby expressly defined to include a computer readable medium such as a memory, DVD, CD, etc. storing the software and/or firmware. Further still, the example apparatus 200 and 300 may include one or more elements, processes and/or devices in addition to, or instead of, those illustrated in FIGS. 2 and 3, and/or may include more than one of any or all of the illustrated elements, processes and devices.

FIGS. 6A, 6B, 7, 8A, 8B, 9, 10A-10C, and 11A-11C are flow diagrams representative of example machine readable instructions that can be executed to implement example methods, apparatus, and systems described herein. The example processes of FIGS. 6A, 6B, 7, 8A, 8B, 9, 10A-10C, and 11A-11C may be implemented using machine readable instructions that, when executed, cause a device (e.g., a programmable controller or other programmable machine or integrated circuit) to perform the operations shown in FIGS. 6A, 6B, 7, 8A, 8B, 9, 10A-10C, and 11A-11C. For instance, the example processes of FIGS. 6A, 6B, 7, 8A, 8B, 9, 10A-10C, and 11A-11C may be performed using a processor, a controller, and/or any other suitable processing device. For example, the example processes of FIGS. 6A, 6B, 7, 8A, 8B, 9, 10A-10C, and 11A-11C may be implemented using coded instructions stored on a tangible machine readable medium such as a flash memory, a read-only memory (ROM), and/or a random-access memory (RAM).

As used herein, the term tangible computer readable medium is expressly defined to include any type of computer readable storage and to exclude propagating signals. Additionally or alternatively, the example processes of FIGS. 6A, 6B, 7, 8A, 8B, 9, 10A-10C, and 11A-11C may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example processes of FIGS. 6A, 6B, 7, 8A, 8B, 9, 10A-10C, and 11A-11C may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 6A, 6B, 7, 8A, 8B, 9, 10A-10C, and 11A-11C may be implemented as any combination(s) of any of the foregoing techniques, for example, any combination of firmware, software, discrete logic and/or hardware.

Although the example processes of FIGS. 6A, 6B, 7, 8A, 8B, 9, 10A-10C, and 11A-11C are described with reference to the flow diagrams of FIGS. 6A, 6B, 7, 8A, 8B, 9, 10A-10C, and 11A-11C, other methods of implementing the processes of FIGS. 6A, 6B, 7, 8A, 8B, 9, 10A-10C, and 11A-11C may be employed. For example, the order of execution of the blocks may be changed, and/or some of the blocks described may be changed, eliminated, sub-divided, or combined. Additionally, one or both of the example processes of FIGS. 6A, 6B, 7, 8A, 8B, 9, 10A-10C, and 11A-11C may be performed sequentially and/or in parallel by, for example, separate processing threads, processors, devices, discrete logic, circuits, etc.

Figure 6A:
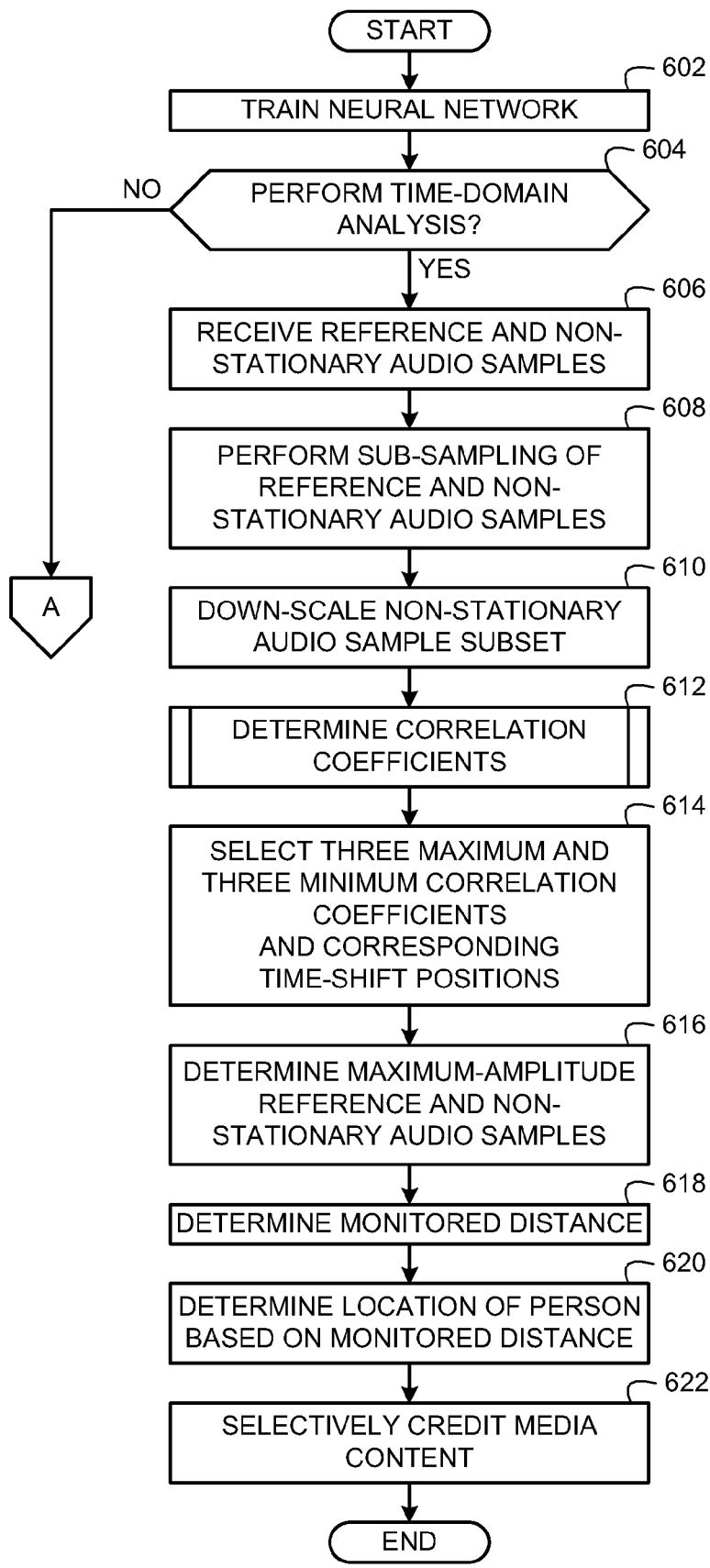
FIGS. 6A and 6B depict a flow diagram representative of example machine readable instructions that may be executed to determine locations of audience members.
Figure 6B:
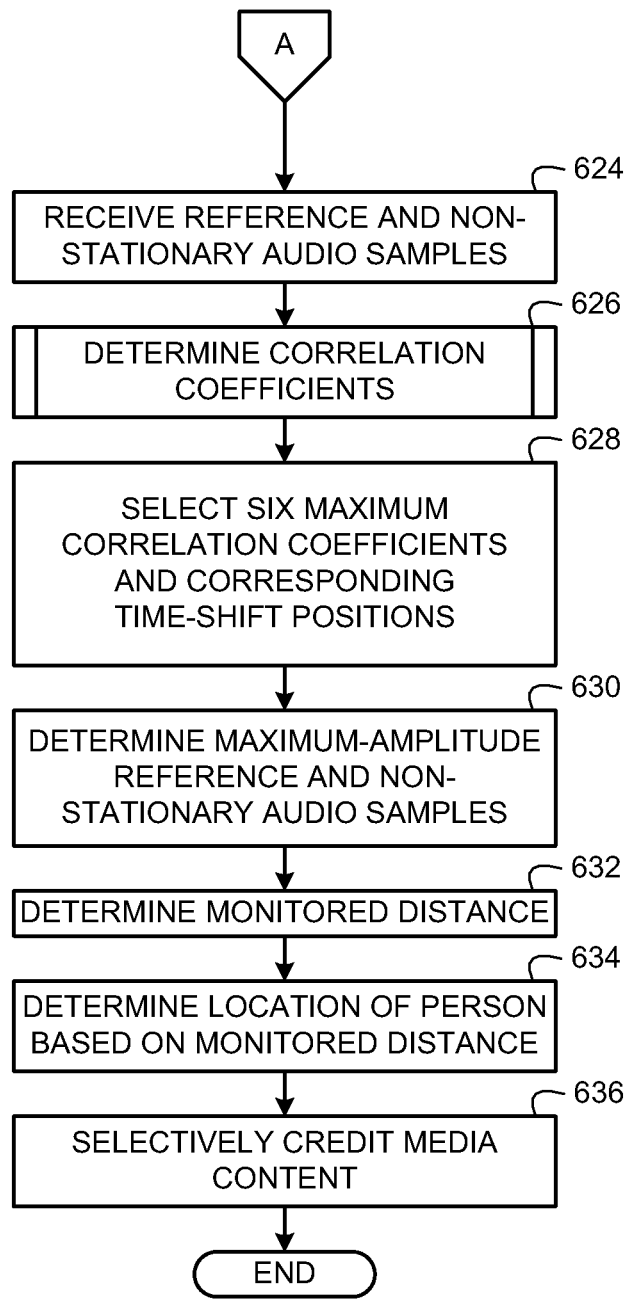

Turning in detail to FIGS. 6A and 6B, the depicted example process may be used to determine locations of audience members (e.g., the person 110 of FIG. 1). Initially, a neural network for use in determining audience member locations is trained (block 602). For example, the apparatus 200 of FIG. 2 may train its neural network 222 for use in determining audience member locations based on time-domain analyses of the reference and non-stationary audio samples 202 and 204 and/or the apparatus 300 of FIG. 3 may train its neural network 322 for use in determining audience member locations based on frequency-domain analyses of the reference and non-stationary audio samples 202 and 204. In either instance, during a training process, the apparatus 200 and/or the apparatus 300 is/are provided with multiple sets of reference and non-stationary audio samples from the stationary reference unit 106 and the portable meter 108 corresponding to the training distances ($d_{T1}$, $d_{T2}$, $d_{T3}$) along with the distance values of the training distances ($d_{T1}$, $d_{T2}$, $d_{T3}$) corresponding to each audio sample set. In this manner, the apparatus 200 and/or the apparatus 300 can train its respective neural network 222 and/or 322 by inputting resulting correlation coefficients (r) and the distance values of the training distances ($d_{T1}$, $d_{T2}$, $d_{T3}$) using any suitable neural network training technique so that the neural network(s) 222 and/or 322 can configure its/their logic to determine distance measures (e.g., the monitored distance $d_M$ of FIG. 1) based on subsequent reference and non-stationary audio samples 202 and 204 collected by the stationary reference unit 106 and the portable meter 108.

After the neural network training phase of block 602, the subsequent operations of the flow diagram of FIGS. 6A and 6B correspond to a monitoring phase in which the apparatus 200 and/or the apparatus 300 received reference and non-stationary audio samples (e.g., the reference and non-stationary audio samples 202 and 204 of FIGS. 2 and 3) to determine monitored distances ($d_M$) of the person 110 of FIG. 1.

Initially, during a monitoring phase, the processing unit 104 determines whether it should perform a time-domain analysis (block 604) using the apparatus 200 of FIG. 2 to determine the monitored distance ($d_M$) of the person 110. In some examples, the processing unit 104 may be pre-programmed or configured by a user (e.g., an installation technician) to always perform time-domain analyses or to always perform frequency-domain analyses. Such configuration may be implemented by setting a software register option (e.g., a flag or bit) in the processing unit 104 or by setting a hardware switch on the processing unit 104 specifying which type of analysis to perform. In instances in which the processing unit 104 is only provided with the example apparatus 200 of FIG. 2 to perform time-domain analyses or is only provided with the example apparatus 300 of FIG. 3 to perform frequency-domain analyses, the decision of block 604 may be omitted. That is, in instances in which the processing unit 104 is only provided with the apparatus 200 to perform time-domain analyses, the processing unit 104 performs the operations of blocks 604, 608, 610, 612, 614, 616, 618, 620, and 622 of FIG. 6A (without needing to perform the decision of block 604) to determine monitored distances ($d_M$) of the person 110 after a neural network training phase in which the neural network 222 (FIG. 2) is trained. Whereas, in instances in which the processing unit 104 is only provided with the apparatus 300 to perform frequency-domain analyses, the processing unit 104 performs the operations shown in FIG. 6B (without needing to perform the decision of block 604) to determine monitored distances ($d_M$) of the person 110 after a neural network training phase in which the neural network 322 (FIG. 3) is trained.

If the processing unit 104 determines at block 604 that it should use a time-domain analysis, the processing unit 104 of FIG. 1 receives the reference and non-stationary audio samples 202 and 204 (block 606). In the illustrated example, the quantity of audio samples collected by each of the stationary reference unit 106 and the portable meter 108 is based on the desired size of the correlation window and time-shift range for determining the correlation coefficients (r). In the illustrated example, for time-domain analyses, each of the stationary reference unit 106 and the portable meter 108 may collect 750 ms of audio samples plus an additional quantity of audio samples equal to twice the duration of the desired time-shift range.

The sub-samplers 208 and 210 of FIG. 2 perform sub-sampling operations on respective ones of the reference and non-stationary audio samples 202 and 204 (block 608) to generate the reference and audio sample subsets 402 and 404 of FIGS. 4A-4C. The down-scaler 212 of FIG. 2 down-scales the non-stationary audio sample subset 404 (block 610). The correlator 214 (FIG. 2) then determines correlation coefficients (r) (e.g., correlation analysis results) (block 612) based on the reference and audio sample subsets 402 and 404. For instances in which neither of the reference and non-stationary audio samples 202 and 204 have a DC bias, the correlator 214 may perform the operation of block 612 using Equation 1 above. An example process that may be used to implement Equation 1 is described below in connection with the flow diagram of FIG. 7. Alternatively, if the reference audio samples 202 do not have a DC bias, but the non-stationary audio samples 204 do have a DC bias, the correlator 214 may perform the operation of block 612 using Equation 2 above.

An example process that may be used to implement Equation 2 is described below in connection with the flow diagram of FIGS. 8A and 8B.

The processing unit 104 then selects three maximum correlation coefficients ($r_{max}$) and three minimum correlation coefficients ($r_{min}$) and corresponding time shift positions ($t_{shift}$) (block 614). For example, the processing unit 104 uses the correlation analyzer 216 of FIG. 2 to perform the operation of block 614 for the time-domain analysis. The processing unit 104 then determines the maximum-amplitude values of the reference and non-stationary audio samples 202 and 204 (block 616). For example, the processing unit 104 uses the maximum level detectors 218 and 220 of FIG. 2 to perform the operation of block 616 for the time-domain analysis.

The processing unit 104 then determines the monitored distance ($d_M$) (block 618) based on the three maximum correlation coefficients ($r_{max}$) the three minimum correlation coefficients ($r_{min}$), the corresponding time shift positions ($t_{shift}$), and the maximum-amplitude values of the reference and non-stationary audio samples 202 and 204. For example, the processing unit 104 uses the neural network 222 of FIG. 2 to perform the operation of block 618 for the time-domain analysis.

The processing unit 104 determines the location of the person 110 in the monitored environment 100 of FIG. 1 based on the monitored distance ($d_M$) (block 620). For example, the processing unit 104 may determine that the location of the person 110 is along the circumference 116 about the media presentation device 112 having a radius equal to the monitored distance ($d_M$).

In the illustrated example, the location of the person 110 is subsequently used to selectively credit media content (block 622) presented via the media presentation device 112. For example, the processing unit 104 may elect to award exposure credit to media content as having been exposed to the person 110 if the person 110 was within a threshold distance (e.g., 10 feet) of the media presentation device 112. Alternatively, the processing unit 104 may elect to withhold crediting the media content with an exposure credit if the determined location indicates that the person 110 was not within a threshold distance (e.g., 10 feet) of the media presentation device 112 to have been adequately exposed to the media content. The threshold distance is selected to be equal to a distance that is sufficiently proximate the media presentation device 112 to assure the person was exposed to the program. The distance selected may be dependent on the environment of use. The example process of FIG. 6A then ends.

Turning now to FIG. 6B, for instances in which the processing unit 104 determines at block 604 (FIG. 6A) that it should perform a frequency-domain analysis (i.e., it should not perform a time-domain analysis), the processing unit 104 of FIG. 1 receives the reference and non-stationary audio samples 202 and 204 (block 624). In the illustrated example, the quantity of audio samples collected by each of the stationary reference unit 106 and the portable meter 108 is based on the desired size of the correlation window and time-shift range for determining the correlation coefficients (r). In the illustrated example, to perform the frequency-domain analysis, each of the stationary reference unit 106 and the portable meter 108 may collect 32 ms of audio samples plus an additional quantity of audio samples equal to twice the duration of the desired time-shift range. Frequency-domain analyses may be advantageously used to improve battery charge performance of the portable meter 108, because less audio samples are required under frequency-domain analyses to achieve similar results as those produced using time-domain analyses.

The processing unit 104 uses the apparatus 300 of FIG. 3 to determine the correlation coefficients (e.g., correlation analysis results) at block 626. In such instances, the correlator 314 uses Equation 4 above to determine the correlation coefficients (r) at block 626 when neither of the reference and non-stationary audio samples 202 and 204 have a DC bias. An example process that may be used to implement Equation 4 is described below in connection with the flow diagram of FIG. 9. Alternatively, if the reference audio samples 202 do not have a DC bias, but the non-stationary audio samples 204 do have a DC bias, the correlator 314 performs the operation of block 626 using Equation 5 above. An example process that may be used to implement Equation 5 is described below in connection with the flow diagram of FIGS. 10A-10C. Alternatively if both of the reference and non-stationary audio samples 202 and 204 have a DC bias or if it is not known whether either of the reference and non-stationary audio samples 202 and 204 have DC biases, the correlator 314 performs the operation of block 626 using Equation 6 as described below in connection with the flow diagram of FIGS. 11A-11C.

The processing unit 104 then selects six maximum correlation coefficients ($r_{max}$) and corresponding time shift positions ($t_{shift}$) (block 628). In the illustrated example, the processing unit 104 uses the correlation analyzer 316 of FIG. 3 to perform the operation of block 628 for the frequency-domain analysis. The processing unit 104 then determines the maximum-amplitude values of the reference and non-stationary audio samples 202 and 204 (block 630). In the illustrated example, the processing unit 104 uses the maximum level detectors 318 and 320 of FIG. 3 to perform the operation of block 630 for the frequency-domain analysis.

The processing unit 104 then determines the monitored distance ($d_M$) (block 632) based on the six maximum correlation coefficients ($r_{max}$), the corresponding time shift positions ($t_{shift}$), and the maximum-amplitude values of the reference and non-stationary audio samples 202 and 204. In the illustrated example, the processing unit 104 uses the neural network 322 of FIG. 3 to perform the operation of block 618 for the frequency-domain analysis.

The processing unit 104 determines the location of the person 110 in the monitored environment 100 of FIG. 1 based on the monitored distance ($d_M$) (block 634). For example, the processing unit 104 may determine that the location of the person 110 is along the circumference 116 about the media presentation device 112 having a radius equal to the monitored distance ($d_M$).

In the illustrated example, the location of the person 110 is subsequently used to selectively credit media content (block 636) presented via the media presentation device 112. For example, the processing unit 104 may elect to award exposure credit to media content as having been exposed to the person 110 if the person 110 was within a threshold distance (e.g., 10 feet) of the media presentation device 112. Alternatively, the processing unit 104 may elect to withhold crediting the media content with an exposure credit if the determined location indicates that the person 110 was not within a threshold distance (e.g., 10 feet) of the media presentation device 112 to have been adequately exposed to the media content. The threshold distance is selected to be equal to a distance that is sufficiently proximate the media presentation device 112 to assure the person was exposed to the program. The distance selected may be dependent on the environment of use. The example process of FIG. 6B then ends.

Figure 7:
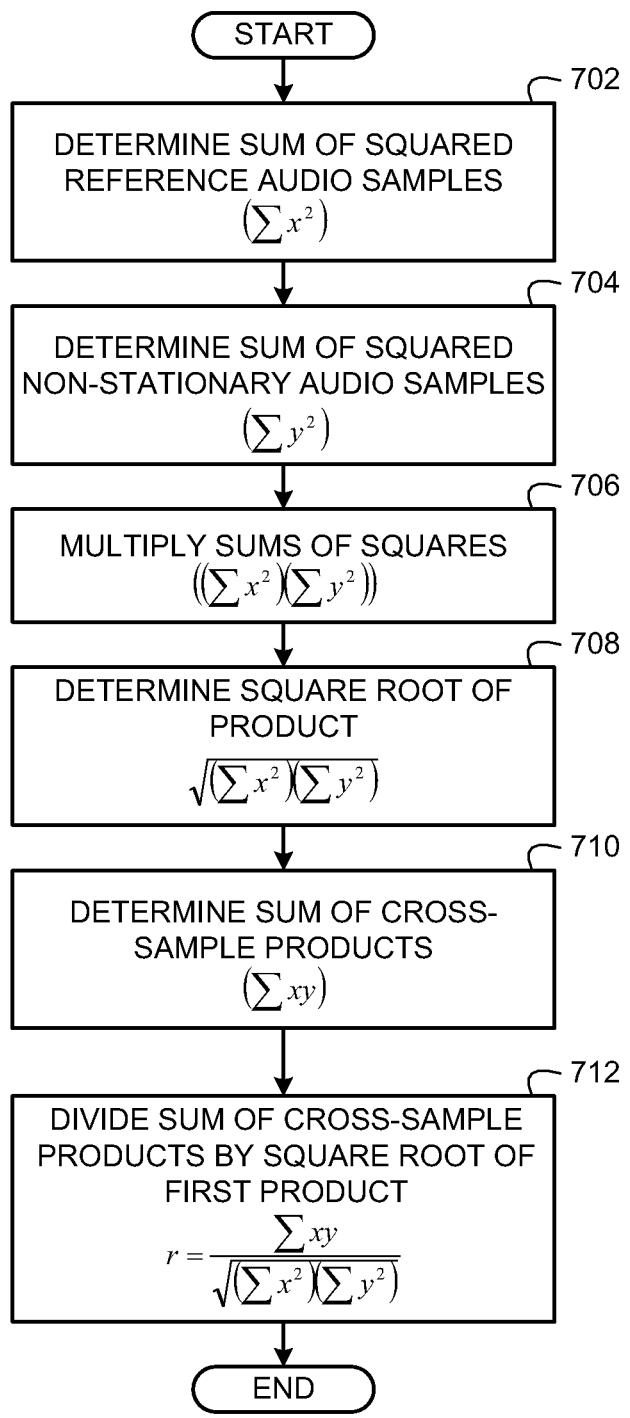
FIG. 7 depicts a flow diagram representative of example machine readable instructions that may be executed to determine correlation coefficients for the process of FIG. 6A based on time-domain analyses when a DC bias is not present in any audio sample set being analyzed.

Turning now to FIG. 7, the depicted example flow diagram is representative of an example process that may be used by the correlator 214 of FIG. 2 to determine correlation coefficients (r) based on Equation 1 above. In the illustrated example, the example process of FIG. 7 may be used to implement the operation of block 612 of FIG. 6A.

Initially, the correlator 214 determines a sum of squared reference audio samples ($\Sigma x^2$) (block 702) based on the square of each audio sample in the reference audio samples 202. The correlator 214 also determines a sum of squared non-stationary audio samples ($\Sigma y^2$) (block 704) based on the square of each audio sample in the non-stationary audio samples 204. The correlator 214 multiplies the sums of squares ($\Sigma x^2$) and ($\Sigma y^2$) to determine a product (($\Sigma x^2$)($\Sigma y^2$)) (block 706) and determines the square root of the product ($\sqrt{(\Sigma x^2)(\Sigma y^2)}$) (block 708). The correlator 214 determines a sum of cross-sample products ($\Sigma xy$) (block 710) based on products (xy) of each reference audio sample 202 (x) and a corresponding one of the non-stationary audio samples 204 (y). The correlator 214 then determines the correlation coefficient (r) associated with the reference and non-stationary audio samples 202 and 204 by dividing the sum of cross-sample products ($\Sigma xy$) by the square root of the first product ($\sqrt{(\Sigma x^2)(\Sigma y^2)}$) (block 712) as shown in Equation 1 (block 710). The example process of FIG. 7 then ends.

Figure 8A:
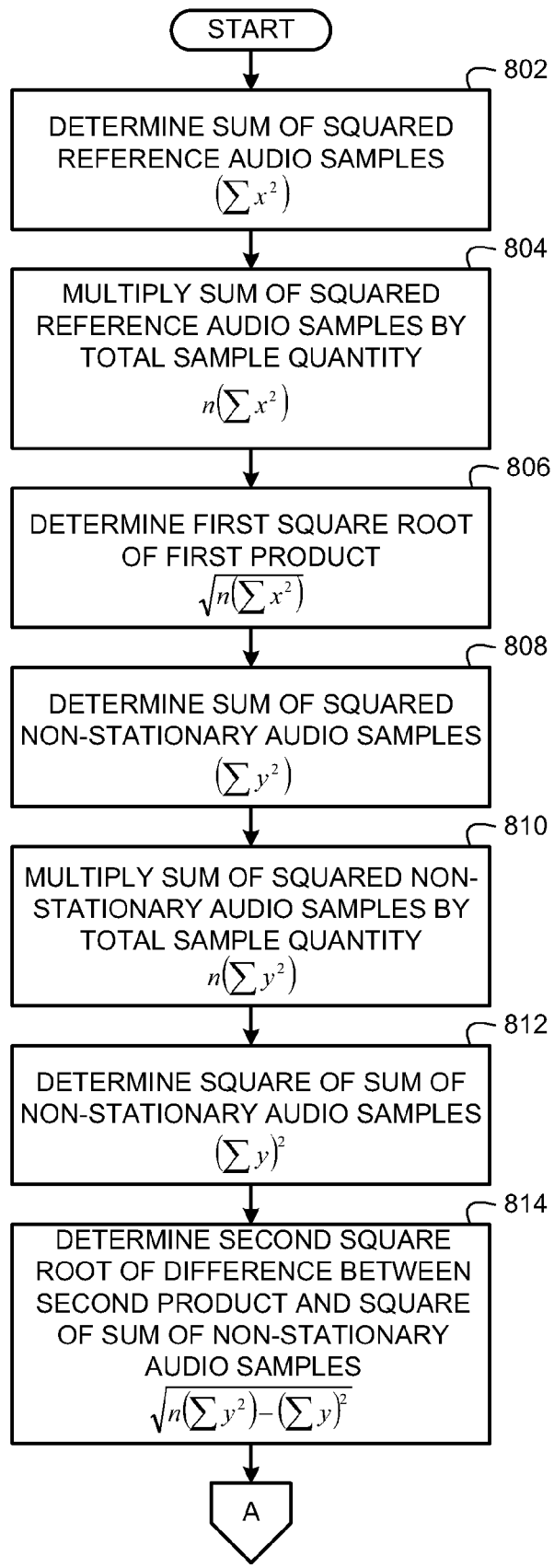
FIGS. 8A and 8B depict a flow diagram representative of example machine readable instructions that may be executed to determine correlation coefficients for the process of FIG. 6A based on time-domain analyses when a DC bias is present in an audio sample set being analyzed.
Figure 8B:
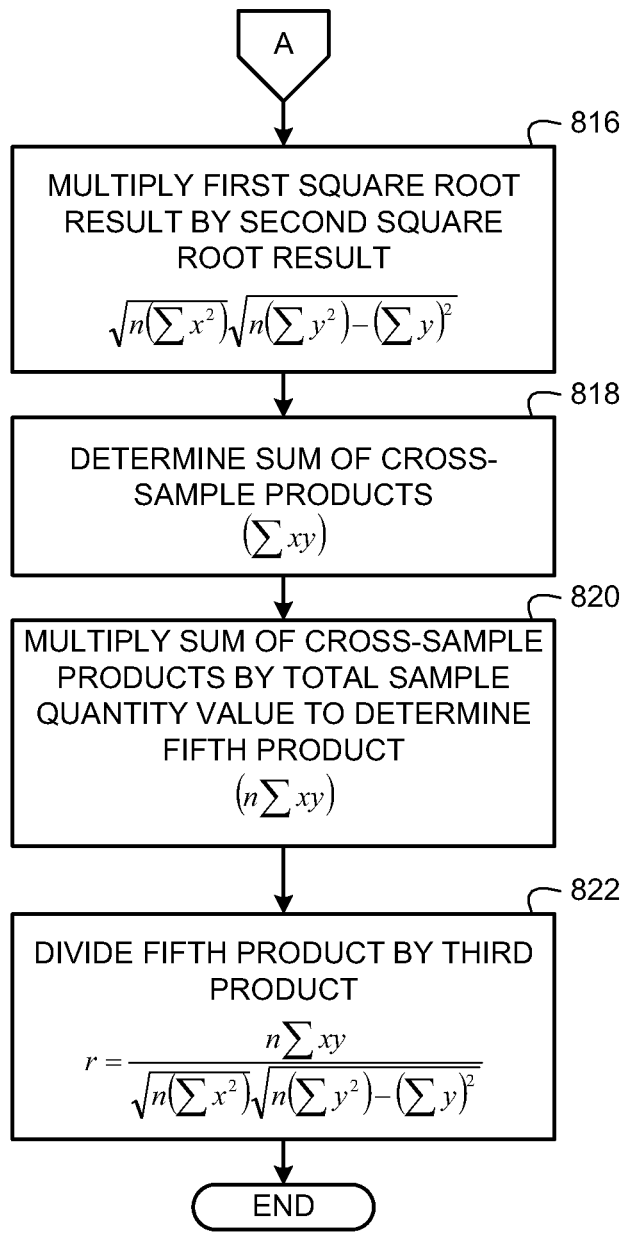

Turning now to FIGS. 8A and 8B, the depicted example flow diagram is representative of an example process that may be performed by the correlator 214 of FIG. 2 to determine correlation coefficients (r) based on Equation 2 above. In the illustrated example, the example process of FIGS. 8A and 8B may be used to implement the operation of block 612 of FIG. 6A.

Initially, the correlator 214 determines a sum of squared reference audio samples ($\Sigma x^2$) (block 802) based on the square of each audio sample in the reference audio samples 202. The correlator 214 then multiplies the sum of squared reference audio samples ($\Sigma x^2$) by a total sample quantity value (n) (block 804) representing the total quantity of audio samples in the reference and non-stationary audio samples 202 and 204 being processed to determine a first product (n($\Sigma x^2$)) and determines a first square root of the first product ($\sqrt{n(\Sigma x^2)}$) (block 806). The correlator 214 also determines a sum of squared non-stationary audio samples ($\Sigma y^2$) (block 808) based on the square of each audio sample in the non-stationary audio samples 204 and multiplies the sum of squared non-stationary audio samples ($\Sigma y^2$) by the total sample quantity value (n) to determine a second product (n($\Sigma y^2$))(block 810). The correlator 214 determines a square of a sum of the non-stationary audio samples 204 (($\Sigma y)^2$) (block 812) and determines a second square root of the difference between the second product (n($\Sigma y^2$)) and the square of the sum of the non-stationary audio samples 204 (($\Sigma y)^2$) (i.e., $\sqrt{n(\Sigma y^2)-(\Sigma y)^2}$) (block 814). The correlator 214 multiplies the first square root result ($\sqrt{n(\Sigma x^2)}$) by the second square root result ($\sqrt{n(\Sigma y^2)-(\Sigma y)^2}$) to determine a third product ($\sqrt{n(\Sigma x^2)}\sqrt{n(\Sigma y^2)-(\Sigma y)^2}$) (block 816) (FIG. 8B). The correlator 214 determines a sum of cross-sample products ($\Sigma xy$) (block 818) based on products (xy) of each reference audio sample 202 (x) and a corresponding one of the non-stationary audio samples 204 (y). The correlator 214 multiplies the sum of cross-sample products ($\Sigma xy$) by the total sample quantity value (n) to determine a fifth product (n$\Sigma xy$) (block 820). The correlator 214 then determines the correlation coefficient (r) by dividing the fifth product (n$\Sigma xy$) by the third product ($\sqrt{n(\Sigma x^2)}\sqrt{n(\Sigma y^2)-(\Sigma y)^2}$) as shown in Equation 2 above (block 822). The example process of FIGS. 8A and 8B then ends.

Figure 9:
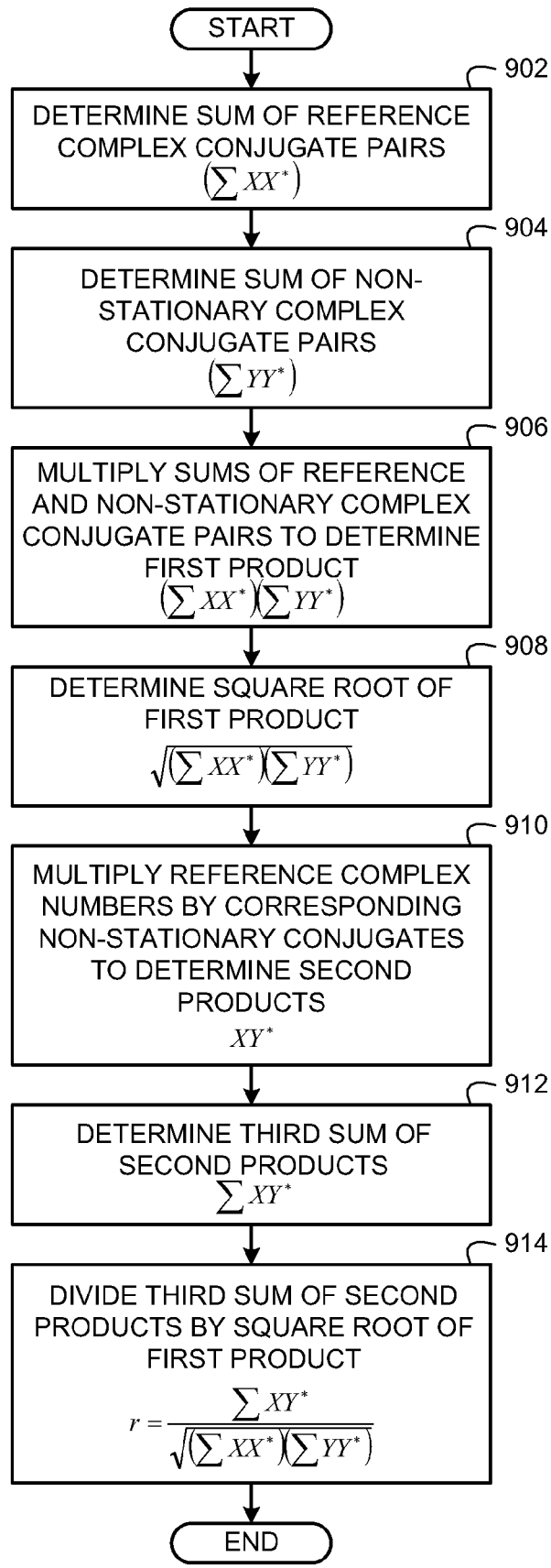
FIG. 9 depicts a flow diagram representative of example machine readable instructions that may be executed to determine correlation coefficients for the process of FIG. 6B based on frequency-domain analyses when a DC bias is not present in any audio sample set being analyzed.

Turning now to FIG. 9, the depicted example flow diagram is representative of an example process that may be performed by the correlator 314 of FIG. 3 to determine correlation coefficients (r) based on Equation 4 above. In the illustrated example, the example process of FIG. 9 may be used to implement the operation of block 626 of FIG. 6B.

Initially, the correlator 314 determines a sum of reference complex conjugate pairs (($\Sigma XX^*$)) of the reference frequency-domain representation 502 (block 902). The correlator 314 determines a sum of non-stationary complex conjugate pairs (($\Sigma YY^*$)) of the non-stationary frequency-domain representation 504 (block 904). The correlator 314 then multiplies the sum of reference complex conjugate pairs (($\Sigma XX^*$)) by the sum of non-stationary complex conjugate pairs (($\Sigma YY^*$)) to determine a first product (($\Sigma XX^*$)($\Sigma YY^*$)) (block 906). The correlator 314 determines the square root of the first product ($\sqrt{(\Sigma XX^*)(\Sigma YY^*)}$) (block 908). The correlator 314 multiplies reference complex numbers of the reference frequency-domain representation 502 by corresponding non-stationary conjugates of the non-stationary frequency-domain representation 504 to determine second products (XY*) (block 910) and determines a third sum of the second products ($\Sigma XY^*$) (block 912). The correlator 314 determines a correlation coefficient (r) associated with the reference and non-stationary audio samples 202 and 204 by dividing the third sum of the second products ($\Sigma XY^*$) by the square root of the first product ($\sqrt{(\Sigma XX^*)(\Sigma YY^*)}$) as shown in Equation 4 above (block 914). The example process of FIG. 9 then ends.

Figure 10A:
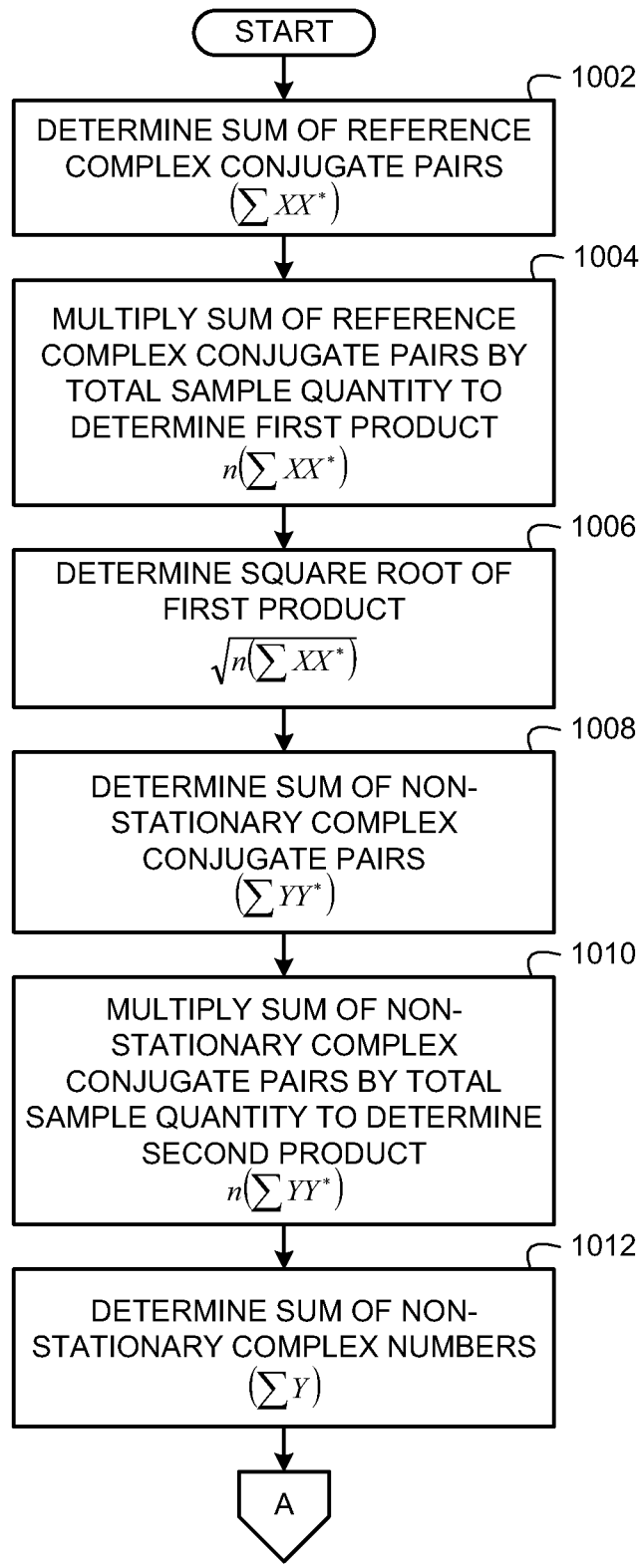
FIGS. 10A-10C depict a flow diagram representative of example machine readable instructions that may be executed to determine correlation coefficients for the process of FIG. 6B based on frequency-domain analyses when a DC bias is present in an audio sample set being analyzed.
Figure 10B:
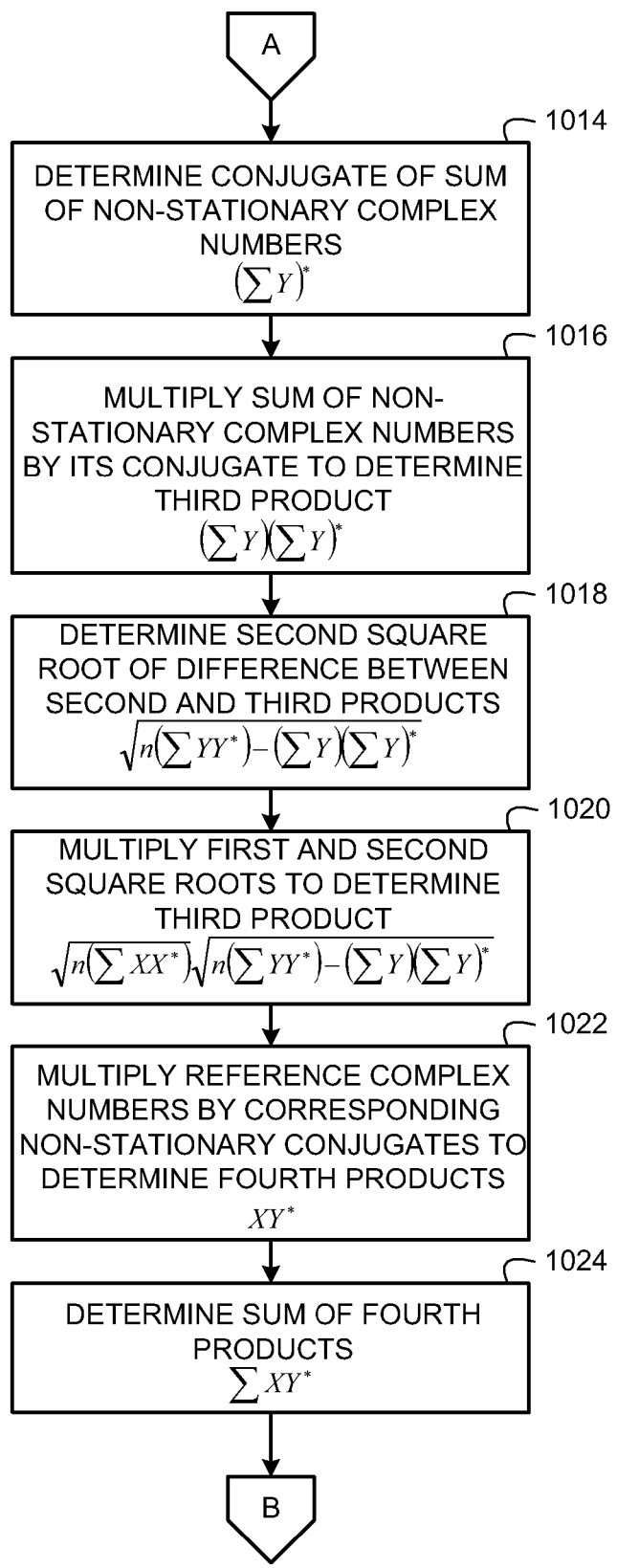
Figure 10C:
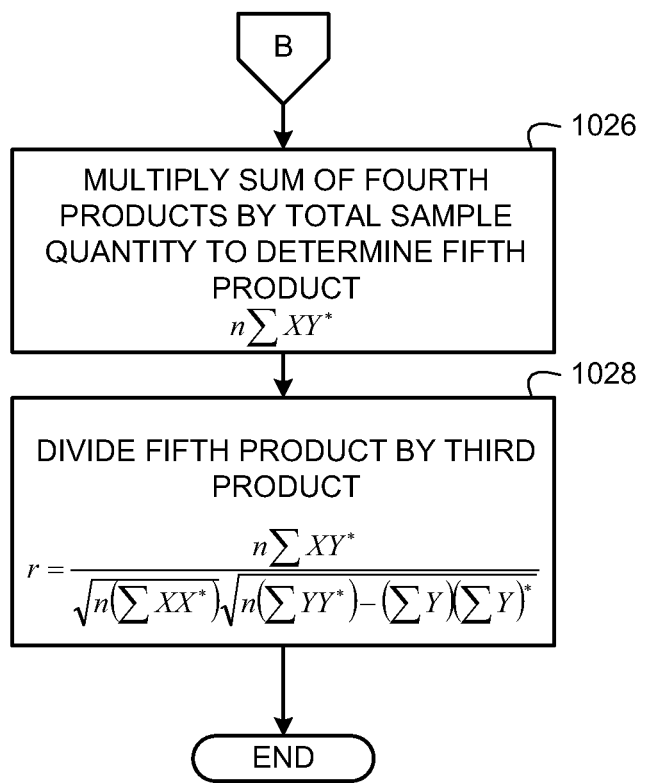

Turning now to FIGS. 10A-10C, the depicted example flow diagram is representative of an example process that may be performed by the correlator 314 of FIG. 3 to determine correlation coefficients (r) based on Equation 5 above. In the illustrated example, the example process of FIGS. 10A-10C may be used to implement the operation of block 626 of FIG. 6B.

Initially, the correlator 314 determines a sum of reference complex conjugate pairs (($\Sigma XX^*$)) of the reference frequency-domain representation 502 (block 1002). The correlator 314 multiplies the sum of reference complex conjugate pairs (($\Sigma XX^*$)) by a total sample quantity value (n) representing the total quantity of the audio samples of the reference and non-stationary audio samples 202 and 204 to determine a first product (n($\Sigma XX^*$)) (block 1004). The correlator 314 determines a square root of the first product ($\sqrt{n(\Sigma XX^*)}$) (block 1006). The correlator 314 determines a sum of non-stationary complex conjugate pairs (($\Sigma YY^*$)) of the non-stationary frequency-domain representation 504 (block 1008) and multiplies the sum of non-stationary complex conjugate pairs (($\Sigma YY^*$)) by the total sample quantity value (n) to determine a second product (n($\Sigma YY^*$)) (block 1010). The correlator 314 determines a sum of non-stationary complex numbers (($\Sigma Y$)) of the non-stationary frequency-domain representation 504 (block 1012) and determines a conjugate of the sum of non-stationary complex numbers (($\Sigma Y$)) (i.e., ($\Sigma Y$)*) (block 1014) (FIG. 10B). The correlator 314 multiplies the sum of non-stationary complex numbers (($\Sigma Y$)) by its conjugate (($\Sigma Y$)*) to generate a third product (($\Sigma Y$)($\Sigma Y$)*) (block 1016). The correlator 314 determines a second square root of the difference between the second product (n($\Sigma YY^*$)) and the third product (($\Sigma Y$)($\Sigma Y$)*) (i.e., $\sqrt{n(\Sigma YY^*)-(\Sigma Y)(\Sigma Y)^*}$) (block 1018). The correlator 314 multiplies the first square root ($\sqrt{n(\Sigma XX^*)}$) by the second square root ($\sqrt{n(\Sigma YY^*)-(\Sigma Y)(\Sigma Y)^*}$) to determine a third product ($\sqrt{n(\Sigma XX^*)}\sqrt{n(\Sigma YY^*)-(\Sigma Y)(\Sigma Y)^*}$) (block 1020). The correlator 314 multiplies reference complex numbers (X) of the reference frequency-domain representation 502 by corresponding non-stationary conjugates (Y*) of the non-stationary frequency-domain representation 504 to determine fourth products (XY*) (block 1022) and determines a sum of the fourth products ($\Sigma XY^*$) (block 1024). The correlator 314 multiplies the sum of the fourth products ($\Sigma XY^*$) by the total sample quantity value (n) to determine a fifth product (n$\Sigma XY^*$) (block 1026) (FIG. 10C). The correlator 314 determines a correlation coefficient (r) by dividing the fifth product (n$\Sigma XY^*$) by the third product ($\sqrt{n(\Sigma XX^*)}\sqrt{n(\Sigma YY^*)-(\Sigma Y)(\Sigma Y)^*}$) as shown in Equation 5 (block 1028). The example process of FIGS. 10A-10C then ends.

Figure 11A:
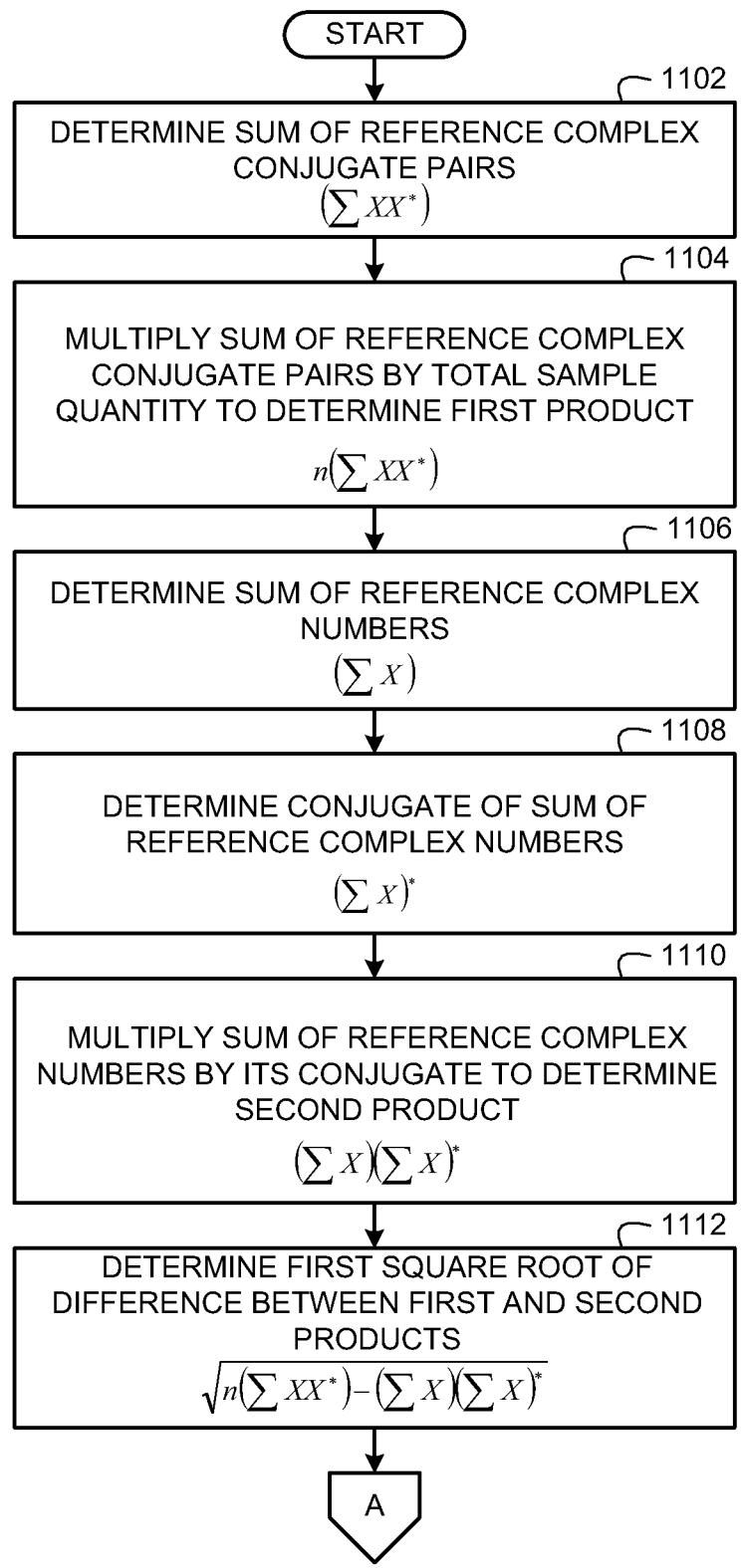
FIGS. 11A-11C depict a flow diagram representative of example machine readable instructions that may be executed to determine correlation coefficients for the process of FIG. 6B based on frequency-domain analyses when a DC bias is present in both audio sample sets being analyzed or when it is unknown whether a DC bias is present in one or both audio sample sets being analyzed.
Figure 11B:
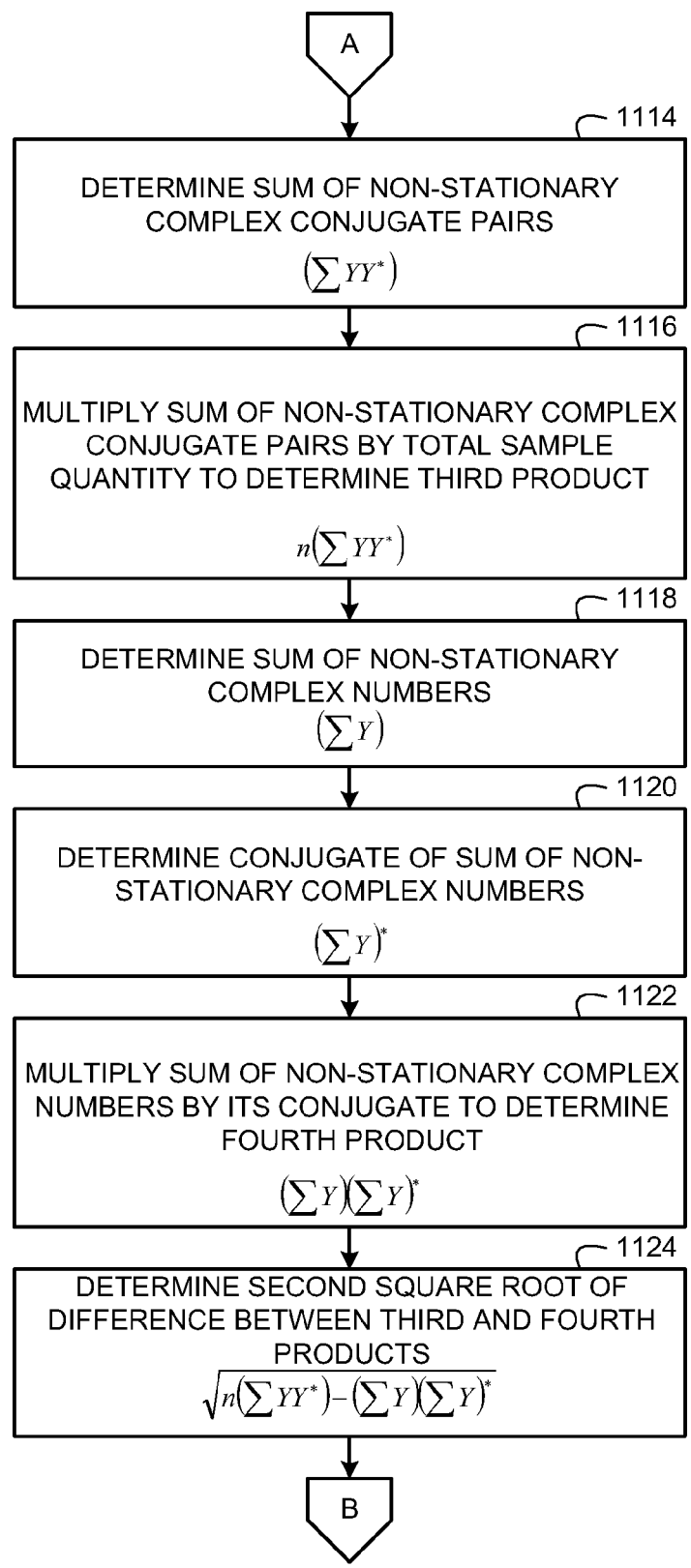
Figure 11C:
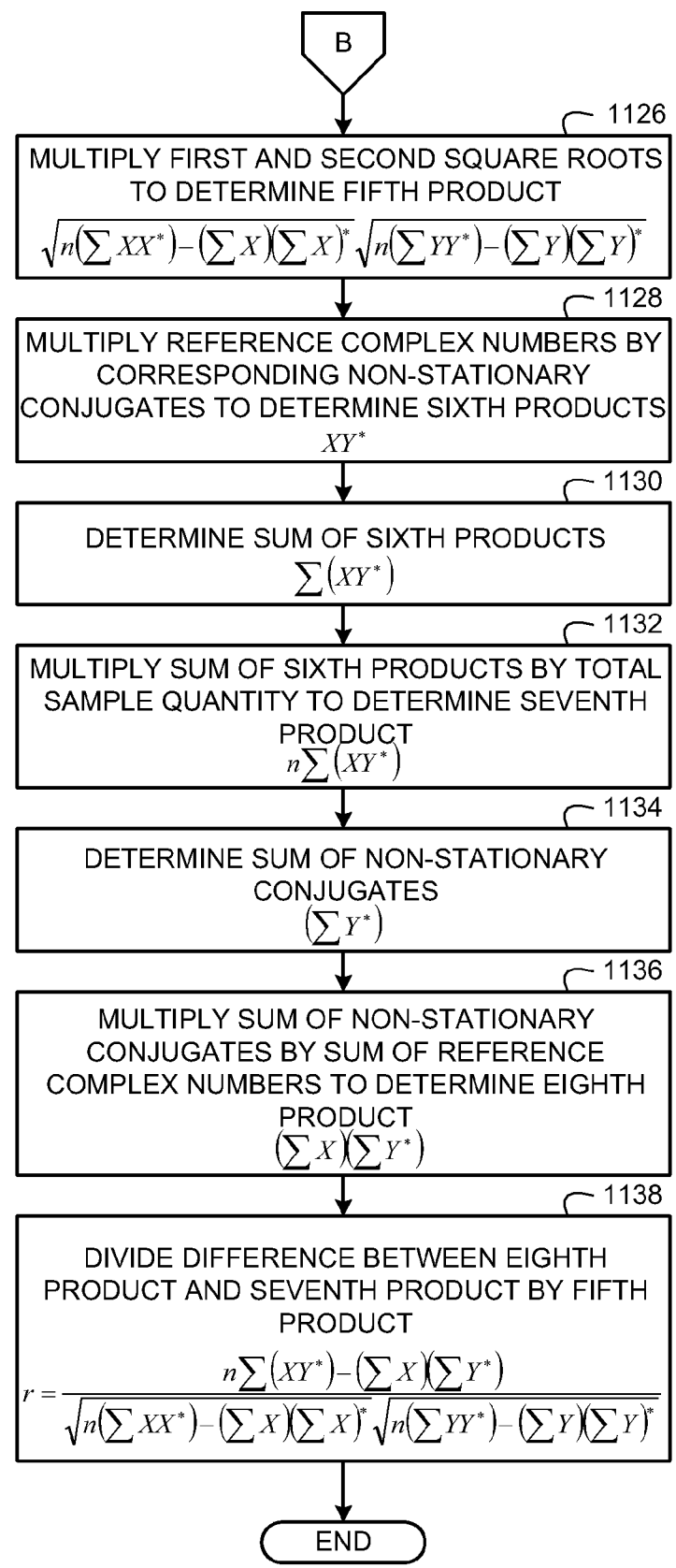

Turning now to FIGS. 11A-11C, the depicted example flow diagram is representative of an example process that may be performed by the correlator 314 of FIG. 3 to determine correlation coefficients (r) based on Equation 6 above. In the illustrated example, the example process of FIGS. 11A-11C may be used to implement the operation of block 626 of FIG. 6B.

Initially, the correlator 314 determines a sum of reference complex conjugate pairs (($\Sigma XX^*$)) of the reference frequency-domain representation 502 (block 1102). The correlator 314 multiplies the sum of reference complex conjugate pairs (($\Sigma XX^*$)) by a total sample quantity value (n) representing the total quantity of the audio samples of the reference and non-stationary audio samples 202 and 204 to determine a first product (n($\Sigma XX^*$)) (block 1104). The correlator 314 determines a sum of reference complex numbers (($\Sigma X$)) of the reference frequency-domain representation 504 (block 1106) and determines a conjugate of the sum of reference complex numbers (($\Sigma X$)) (i.e., ($\Sigma X$)*) (block 1108). The correlator 314 multiplies the sum of reference complex numbers (($\Sigma X$)) by its conjugate (($\Sigma X$)*) to generate a second product (($\Sigma X$)($\Sigma X$)*) (block 1110). The correlator 314 determines a first square root of the difference between the first product (n($\Sigma XX^*$)) and the second product (($\Sigma X$)($\Sigma X$)*) (i.e., $\sqrt{n(\Sigma XX^*)-(\Sigma X)(\Sigma X)^*}$) (block 1112).

The correlator 314 determines a sum of non-stationary complex conjugate pairs (($\Sigma YY^*$)) of the non-stationary frequency-domain representation 504 (block 1114) (FIG. 11B) and multiplies the sum of non-stationary complex conjugate pairs (($\Sigma YY^*$)) by the total sample quantity value (n) to determine a third product (n($\Sigma YY^*$)) (block 1116). The correlator 314 determines a sum of non-stationary complex numbers (($\Sigma Y$)) of the non-stationary frequency-domain representation 504 (block 1118) and determines a conjugate of the sum of non-stationary complex numbers (($\Sigma Y$)) (i.e., ($\Sigma Y$)*) (block 1120). The correlator 314 multiplies the sum of non-stationary complex numbers (($\Sigma Y$)) by its conjugate (($\Sigma Y$)*) to generate a fourth product (($\Sigma Y$)($\Sigma Y$)*) (block 1122). The correlator 314 determines a second square root of the difference between the third product (n($\Sigma YY^*$)) and the fourth product (($\Sigma Y$)($\Sigma Y$)*) (i.e., $\sqrt{n(\Sigma YY^*)-(\Sigma Y)(\Sigma Y)^*}$) (block 1124).

The correlator 314 multiples the first and second square roots to determine a fifth product ($\sqrt{n(\Sigma XX^*)-(\Sigma X)(\Sigma X)^*}\sqrt{n(\Sigma YY^*)-(\Sigma Y)(\Sigma Y)^*}$) (block 1126) (FIG. 11C). The correlator 314 multiplies reference complex numbers (X) of the reference frequency-domain representation 502 by corresponding non-stationary conjugates (Y*) of the non-stationary frequency-domain representation 504 to determine sixth products (XY*) (block 1128) and determines a sum of the sixth products ($\Sigma(XY^*)$) (block 1130). The correlator 314 multiplies the sum of the sixth products ($\Sigma(XY^*)$) by the total sample quantity value (n) to determine a seventh product (n$\Sigma(XY^*)$) (block 1132).

The correlator 314 determines a sum of non-stationary conjugates (($\Sigma Y^*$)) (block 1134). The correlator 314 multiples the sum of non-stationary conjugates by the sum of reference complex numbers to determine an eighth product (($\Sigma X$)($\Sigma Y^*$)) (block 1136). The correlator 314 determines a correlation coefficient (r) by dividing the difference between the eighth product (($\Sigma X$)($\Sigma Y^*$)) and seventh product (n$\Sigma$ (XY*)) by the fifth product ($\sqrt{n(\Sigma XX^*)-(\Sigma X)(\Sigma X)^*}$ $\sqrt{n(\Sigma YY^*)-(\Sigma Y)(\Sigma Y)^*}$) as shown in Equation 6 (block 1138). The example process of FIGS. 11A-11C then ends.

Figure 12:
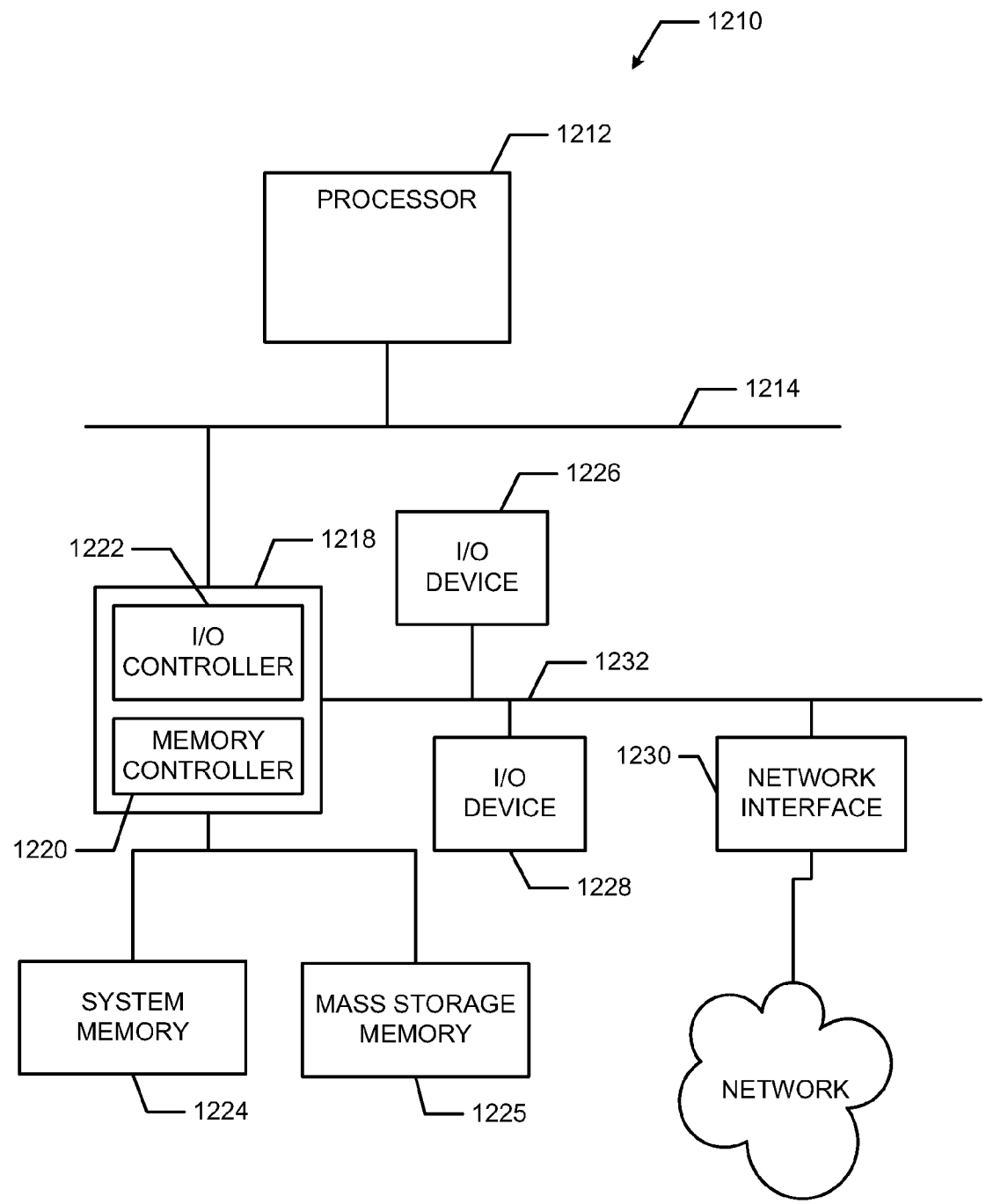
FIG. 12 is an example processor system that can be used to execute the example instructions of FIGS. 6A, 6B, 7, 8A, 8B, 9, 10A-10C, and 11A-11C to implement the example apparatus and/or systems of FIGS. 1, 2, and 3 described herein.

FIG. 12 is a block diagram of an example processor system 1210 that may be used to implement the example apparatus, methods, and systems described herein. As shown in FIG. 12, the processor system 1210 includes a processor 1212 that is coupled to an interconnection bus 1214. The processor 1212 may be any suitable processor, processing unit, or microprocessor. Although not shown in FIG. 12, the system 1210 may be a multi-processor system and, thus, may include one or more additional processors that are identical or similar to the processor 1212 and that are communicatively coupled to the interconnection bus 1214.

The processor 1212 of FIG. 12 is coupled to a chipset 1218, which includes a memory controller 1220 and an input/output (I/O) controller 1222. A chipset provides I/O and memory management functions as well as a plurality of general purpose and/or special purpose registers, timers, etc. that are accessible or used by one or more processors coupled to the chipset 1218. The memory controller 1220 performs functions that enable the processor 1212 (or processors if there are multiple processors) to access a system memory 1224 and a mass storage memory 1225.

In general, the system memory 1224 may include any desired type of volatile and/or non-volatile memory such as, for example, static random access memory (SRAM), dynamic random access memory (DRAM), flash memory, read-only memory (ROM), etc. The mass storage memory 1225 may include any desired type of mass storage device including hard disk drives, optical drives, tape storage devices, etc.

The I/O controller 1222 performs functions that enable the processor 1212 to communicate with peripheral input/output (I/O) devices 1226 and 1228 and a network interface 1230 via an I/O bus 1232. The I/O devices 1226 and 1228 may be any desired type of I/O device such as, for example, a keyboard, a video display or monitor, a mouse, etc. The network interface 1230 may be, for example, an Ethernet device, an asynchronous transfer mode (ATM) device, an 802.11 device, a digital subscriber line (DSL) modem, a cable modem, a cellular modem, etc. that enables the processor system 1210 to communicate with another processor system.

While the memory controller 1220 and the I/O controller 1222 are depicted in FIG. 12 as separate functional blocks within the chipset 1218, the functions performed by these blocks may be integrated within a single semiconductor circuit or may be implemented using two or more separate integrated circuits.

Although the above discloses example methods, apparatus, systems, and articles of manufacture including, among other components, firmware and/or software executed on hardware, it should be noted that such methods, apparatus, systems, and articles of manufacture are merely illustrative and should not be considered as limiting. Accordingly, while the above describes example methods, apparatus, systems, and articles of manufacture, the examples provided are not the only ways to implement such methods, apparatus, systems, and articles of manufacture.

Although certain example methods, apparatus, systems, and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to credit media presented by a media presentation device, the method comprising:
   determining, via a neural network, a first distance of a first portable audio detector from a stationary unit, the first portable audio detector associated with a first panelist, the stationary unit located in proximity to the media presentation device;
   determining, via the neural network, a second distance of a second portable audio detector from the stationary unit, the second portable audio detector associated with a second panelist;
   in response to the first distance being less than a threshold distance, crediting the media with an exposure credit, the exposure credit indicative of the media being exposed to the first panelist; and
   in response to the second distance being more than the threshold distance, not crediting the media as exposed to the second panelist.

2. A method as defined in claim 1, wherein the neural network is trainable to detect different distances of portable audio detectors by analyzing audio samples corresponding to different training distances in a monitoring environment.

3. A method as defined in claim 1, wherein the stationary unit is separate from the media presentation device.

4. A method as defined in claim 1, wherein the determining of the first distance occurs in real-time when first audio samples are collected by the stationary unit from the first portable audio detector.

5. A method as defined in claim 1, wherein the determining of the first distance includes using a post-process after first audio samples are received.

6. A method to credit media presented by a media presentation device, the method comprising:
   determining, using a neural network, a first distance of a first portable audio detector from a stationary unit, the first portable audio detector associated with a first panelist, the stationary unit located in proximity to the media presentation device, wherein the neural network determines the first distance by performing a correlation analysis on first audio samples of the media collected by the stationary unit and on second audio samples collected by the first portable audio detector;
   determining, using the neural network, a second distance of a second portable audio detector from the stationary unit, the second portable audio detector associated with a second panelist;
   in response to the first distance being less than a threshold distance, crediting the media as exposed to the first panelist; and
   in response to the second distance being more than the threshold distance, not crediting the media as exposed to the second panelist.

7. A method as defined in claim 6, wherein the correlation analysis is performed in the frequency domain.

8. A tangible machine accessible medium comprising instructions that, when executed, cause a machine in communication with a stationary unit located adjacent to a media presentation device that is to present media to at least:
   determine, via a neural network, a first distance of a first portable audio detector from the stationary unit, the first portable audio detector exposed to the media and associated with a first panelist;

determine, via the neural network, a second distance of a second portable audio detector from the stationary unit, the second portable audio detector exposed to the media and associated with a second panelist;

in response to the first distance being less than a threshold distance, credit the media with an exposure credit, the exposure credit indicative of the media being exposed to the first panelist; and in response to the second distance being more than the threshold distance, not credit the media as exposed to the second panelist.

9. The tangible machine accessible medium of claim 8, wherein the instructions further cause the machine to train the neural network to detect different distances of portable audio detectors by analyzing audio samples corresponding to different training distances in a monitoring environment.

10. The tangible machine accessible medium of claim 8, wherein the stationary unit is separate from the media presentation device.

11. The tangible machine accessible medium of claim 8, wherein the instructions are further to cause the machine to determine, via the neural network, the first distance of the first portable audio detector from the stationary unit in real-time when first audio samples are collected from the first portable audio detector.

12. The tangible machine accessible medium of claim 8, wherein the instructions are further to cause the machine to determine, via the neural network, the first distance of the first portable audio detector from the stationary unit at a time after first audio samples are collected by the stationary unit from the first portable audio detector.

13. A tangible machine accessible medium comprising instructions that, when executed, cause a machine in communication with a stationary unit located adjacent a media presentation device that is to present media to at least:

determine, via a neural network, a first distance of a first portable audio detector from the stationary unit by performing a correlation analysis on first audio samples of the media collected by the stationary unit and on second audio samples collected by the first portable audio detector, the first portable audio detector exposed to the media and associated with a first panelist;

determine, via the neural network, a second distance of a second portable audio detector from the stationary unit, the second portable audio detector exposed to the media and associated with a second panelist;

in response to the first distance being less than a threshold distance, credit the media as exposed to the first panelist; and in response to the second distance being more than the threshold distance, not credit the media as exposed to the second panelist.

14. The tangible machine accessible medium of claim 13, wherein the neural network is to perform the correlation analysis in the frequency domain.

15. A processing unit in communication with a stationary unit located in proximity to a media presentation device that is to present media, the processing unit comprising:

a neural network to:

determine a first distance of a first portable audio detector from the stationary unit, the first portable audio detector associated with a first panelist; and determine a second distance of a second portable audio detector from the stationary unit, the second portable audio detector associated with a second panelist; and a processor to:

in response to the first distance being less than a threshold distance, store an exposure credit to indicate the media was exposed to the second panelist; and in response to the second distance being more than the threshold distance, not store the exposure credit to indicate the media was exposed to the second panelist.

16. A processing unit as defined in claim 15, wherein the neural network is trainable to detect different distances of portable audio detectors by analyzing audio samples corresponding to different training distances in a monitoring environment.

17. A processing unit as defined in claim 15, wherein the stationary unit is separate from the media presentation device.

18. A processing unit as defined in claim 15, wherein the neural network is to determine the first distance of the first portable audio detector from the stationary unit in real-time when first audio samples are collected by the stationary unit from the first portable audio detector.

19. A processing unit as defined in claim 15, wherein the neural network is to determine the first distance of the first portable audio detector from the stationary unit by executing a post-process after first audio samples are received.

20. An apparatus comprising:

a processor; and a memory to store machine readable instructions that, when executed by the processor, cause the processor to perform operations including:

determining, using a neural network, a first distance of a first portable audio detector from a stationary unit, the first portable audio detector associated with a first panelist, the stationary unit located in proximity to a media presentation device that is to present media, wherein the neural network determines the first distance by performing a correlation analysis on first audio samples of the media collected by the stationary unit and on second audio samples collected by the first portable audio detector;

determining, using the neural network, a second distance of a second portable audio detector from the stationary unit, the second portable audio detector associated with a second panelist;

in response to the first distance being less than a threshold distance, crediting the media as exposed to the first panelist; and in response to the second distance being more than the threshold distance, not crediting the media as exposed to the second panelist.

21. An apparatus as defined in claim 20, wherein the processor is to perform the correlation analysis in the frequency domain.

* * * * *